US010484146B2

(12) United States Patent
Sun et al.

(10) Patent No.: US 10,484,146 B2
(45) Date of Patent: Nov. 19, 2019

(54) DOWNLINK RETRANSMISSION UNDER UNRELIABLE CODE BLOCK GROUP (CBG) LEVEL ACK/NACK FEEDBACK

(71) Applicant: QUALCOMM Incorporated, San Diego, CA (US)

(72) Inventors: Jing Sun, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 15/711,652

(22) Filed: Sep. 21, 2017

(65) Prior Publication Data
US 2018/0278379 A1 Sep. 27, 2018

Related U.S. Application Data

(60) Provisional application No. 62/475,752, filed on Mar. 23, 2017.

(51) Int. Cl.
| | |
|---|---|
| *H04L 1/18* | (2006.01) |
| *H04L 1/08* | (2006.01) |
| *H04W 72/04* | (2009.01) |

(52) U.S. Cl.
CPC ............ *H04L 1/1861* (2013.01); *H04L 1/08* (2013.01); *H04W 72/042* (2013.01)

(58) Field of Classification Search
CPC ....... H04L 1/1861; H04L 1/0061; H04L 1/08; H04L 1/1614; H04L 1/1845;
(Continued)

(56) References Cited

U.S. PATENT DOCUMENTS

| | | | | |
|---|---|---|---|---|
| 9,992,004 | B2* | 6/2018 | Mallik | .................. H04L 5/0055 |
| 2016/0226643 | A1* | 8/2016 | Mallik | .................. H04L 5/0055 |

(Continued)

FOREIGN PATENT DOCUMENTS

WO  WO-2016126330 A1  8/2016

OTHER PUBLICATIONS

Intel Corporation: "Design Aspects Affecting Reliability of URLLC Services", 3GPP Draft; R1-1702243 Intel—URLLC_RELIABILITY, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), pp. 1-7, XP051209401, Retrieved from the Internet: URL: http://www.3gpp.org/ftp/Meetings_3GPPSYNC/RAN1/Docs/ [retrieved on Feb. 12, 2017].

(Continued)

*Primary Examiner* — John J Tabone, Jr.
(74) *Attorney, Agent, or Firm* — Patterson & Sheridan, L.L.P.

(57) ABSTRACT

Methods and Apparatus are provided for downlink retransmission of Code Block Groups (CBGs) when CBG level ACK and NACK feedback is unreliable. A User Equipment (UE) transmits to a Base Station (BS) feedback indicating an Acknowledgement (ACK) or a Negative Acknowledgement (NACK) corresponding to each of received set of CBGs transmitted by the BS to the UE. The BS receives and decodes the feedback and transmits back to the UE information regarding a result of the decoding. The UE, based on the received information, determines whether the BS correctly received and decoded the ACK/NACK feedback, and in some cases, ACKs and NACKs corresponding to which CBGs were incorrectly decoded by the BS. The UE pro- (Continued)

cesses retransmitted CBGs received from the BS based on this determination.

48 Claims, 23 Drawing Sheets

(58) Field of Classification Search
CPC ... H04L 1/1896; H04L 1/1671; H04L 5/0055; H04L 1/0057; H04L 1/1819; H04W 72/042
USPC ......................................... 714/750, 748, 749
See application file for complete search history.

(56) References Cited

U.S. PATENT DOCUMENTS

| | | | |
|---|---|---|---|
| 2017/0207895 A1* | 7/2017 | Yang | H04L 1/18 |
| 2017/0310431 A1* | 10/2017 | Iyer | H04L 1/1816 |
| 2018/0054800 A1* | 2/2018 | Yeo | H04L 5/0035 |
| 2018/0070341 A1* | 3/2018 | Islam | H04L 1/1887 |
| 2018/0123767 A1* | 5/2018 | Islam | H04L 1/1816 |
| 2018/0132272 A1* | 5/2018 | Sun | H04W 48/12 |
| 2018/0145797 A1* | 5/2018 | Yeo | H04L 1/1812 |
| 2018/0167932 A1* | 6/2018 | Papasakellariou | H04L 1/1671 |
| 2018/0234881 A1* | 8/2018 | Hosseini | H04W 28/04 |
| 2018/0262316 A1* | 9/2018 | Wang | H04W 72/1278 |
| 2018/0269898 A1* | 9/2018 | Sun | H04L 1/0083 |
| 2018/0270022 A1* | 9/2018 | Sun | H04L 1/1893 |
| 2018/0270023 A1* | 9/2018 | Jiang | H04L 1/1819 |
| 2019/0104532 A1* | 4/2019 | Park | H04W 72/1263 |

OTHER PUBLICATIONS

International Search Report and Written Opinion—PCT/US2018/019724—ISA/EPO—dated May 8, 2018.
Samsung: "Evaluation Results of Partial Retransmission for eMBB", 3GPP Draft; R1-1700960—Evaluation Results of Partial Retransmission for EMBB, 3rd Generation Partnership Project (3GPP), Mobile Competence Centre; 650, Route Des Lucioles; F-06921 Sophia-Antipolis, vol. RAN WG1, No. Spokane, USA; Jan. 16, 2017-Jan. 20, 2017, Jan. 16, 2017 (Jan. 16, 2017), 5 Pages, XP051208476, Retrieved from the Internet: URL: http://www.3gpp.org/ftp/Meetings_3GPP_SYNC/RAN1/Docs/ [retrieved on Jan. 16, 2017].

* cited by examiner

DOWNLINK RETRANSMISSION UNDER UNRELIABLE CODE BLOCK GROUP (CBG) LEVEL ACK/NACK FEEDBACK

This application claims priority to U.S. Provisional Application No. 62/475,752, entitled "DOWNLINK RETRANSMISSION UNDER UNRELIABLE CODE BLOCK (CBG) LEVEL ACK/NACK FEEDBACK", filed on Mar. 23, 2017, which is expressly incorporated by reference in its entirety.

FIELD

Aspects of the present disclosure relate to wireless communications, and more particularly, to techniques for downlink retransmission of Code Block Groups (CBGs) when CBG level ACK and NACK feedback is unreliable.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

Certain designs provide long CRC (Cyclic Redundancy Check) protection for Code Block Group (CBG) level Acknowledgement (ACK)/Negative ACK (HACK) feedback and assume that the CBG ACK/NACK feedback from a UE is reliably received by the gNB. Thus, these designs do not consider error events in receiving the feedback at the gNB.

However, in $5^{th}$ Generation (5G) New Radio (NR) design, there is either no CRC or the CRC is not long enough for CBG ACK/NACK feedback resulting in potential errors in receiving the CBG ACK/NACK feedback at the gNB. Thus, when a UE feeds back CBG ACK/NACK there may be a decoding error at the gNB receiving the feedback and the gNB may retransmit a wrong set of CBGs. For example, a UE may transmit CBG ACK/NACK feedback including NACKs for a set A of CBGs indicating that the CBGs in set A were not received correctly at the UE. The gNB however may incorrectly decode the feedback from the UE and retransmit a different set B of CBGs to the UE. This may lead the UE to combine Log Likelihood Ratios (LLRs) from CBGs in set B with LLRs from CBGs in set A from a previous transmission of CBGs in set A. This mismatch may result in a failure in decoding one or more set A CBGs

BRIEF SUMMARY

Certain aspects of the present disclosure discuss techniques for retransmission of CBGs when CBG level ACK/NACK feedback is unreliable. These techniques include the gNB sending an indication to the UE regarding whether a CBG ACK/NACK feedback was correctly received by the gNB. The UE processes a retransmission of one or more CBGs based on the indication received from the gNB.

For example, the CBG ACK/NACK feedback from the UE includes information regarding a first bitmap of ACKs and NACKs corresponding to the CBGs received from the gNB. The gNB receives and decodes the information regarding the first bitmap received from the UE and transmits back to the UE information regarding a result of the decoding. For example, the gNB transmits to the UE information regarding a second bitmap of ACKs and NACKs as decoded by the gNB. The UE, based on the second bitmap received from the gNB, may determine whether the gNB correctly received and decoded the ACK/NACK feedback, and also ACKs and NACKs corresponding to which CBGs were incorrectly decoded by the gNB. In an aspect, the UE compares the second bitmap received from the gNB with the first bitmap it transmitted to the gNB. If the second bitmap is the same as the first bitmap the UE determines that the gNB decoded the ACK/NACK feedback correctly, and continues decoding CBGs retransmitted from the gNB (e.g., based on the second bitmap), for example, by soft combining of LLRs. If the second bitmap is not same as the first bitmap, the UE determines that the gNB was unable to decode the ACK/NACK feedback correctly, and does not use one or more CBGs retransmitted from the gNB (e.g., based on the second bitmap) for decoding.

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications that may be performed by a User Equipment (UE). The method generally includes transmitting to a base station (BS), feedback indicating an Acknowledgement (ACK) or a Negative Acknowledgement (NACK) corresponding to each of received set of code block groups (CBGs) transmitted by the BS, receiving an indication including information regarding whether the feedback was correctly received at the BS, and processing a retransmission of one or more of the CBGs based on the received indication.

Certain aspects of the present disclosure provide a method for wireless communications that may be performed by a Base Station (BS). The method generally includes receiving, from a User Equipment (UE), feedback indicating an Acknowledgement (ACK) or a Negative Acknowledgement (NACK) corresponding to each of received set of code block groups (CBGs) transmitted by the BS, transmitting an indication including information regarding whether the feedback was correctly received at the BS, and retransmitting one or more of the CBGs based on the transmitted indication.

Certain aspects of the present disclosure provide an apparatus for wireless communications by a User Equipment (UE). The apparatus generally includes means for transmitting to a base station (BS), feedback indicating an Acknowledgement (ACK) or a Negative Acknowledgement (NACK) corresponding to each of received set of code block groups (CBGs) transmitted by the BS, means for receiving an indication including information regarding whether the feedback was correctly received at the BS, and means for processing a retransmission of one or more of the CBGs based on the received indication.

Certain aspects of the present disclosure provide an apparatus for wireless communications by a Base Station (BS). The apparatus generally includes means for receiving, from a User Equipment (UE), feedback indicating an Acknowledgement (ACK) or a Negative Acknowledgement (NACK) corresponding to each of received set of code block groups (CBGs) transmitted by the BS, means for transmitting an indication including information regarding whether the feedback was correctly received at the BS, and means for retransmitting one or more of the CBGs based on the transmitted indication.

Certain aspects of the present disclosure provide a method for wireless communications that may be performed by a User Equipment (UE). The method generally includes transmitting to a base station (BS), feedback indicating an Acknowledgement (ACK) or a Negative Acknowledgement (NACK) corresponding to each of received set of code block groups (CBGs) transmitted by the BS to the UE, receiving retransmission of one or more of the CBGs based on the feedback, receiving an indication to reset collection of Log Likelihood Ratios (LLRs) for at least one of the retransmitted CBGs, and processing the retransmission based on the indication.

Certain aspects of the present disclosure provide a method for wireless communications that may be performed by a Base Station (BS). The method generally includes receiving, from a User Equipment (UE), feedback indicating an Acknowledgement (ACK) or a Negative Acknowledgement (NACK) corresponding to each of received set of code block groups (CBGs) transmitted by the BS, retransmitting one or more of the CBGs based on the feedback, determining that data corresponding to one or more of the CBGs transmitted by the BS was punctured by other data, and in response to the determination, transmitting an indication to reset collection of Log Likelihood Ratios (LLRs) at the UE for at least one of the retransmitted CBGs.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
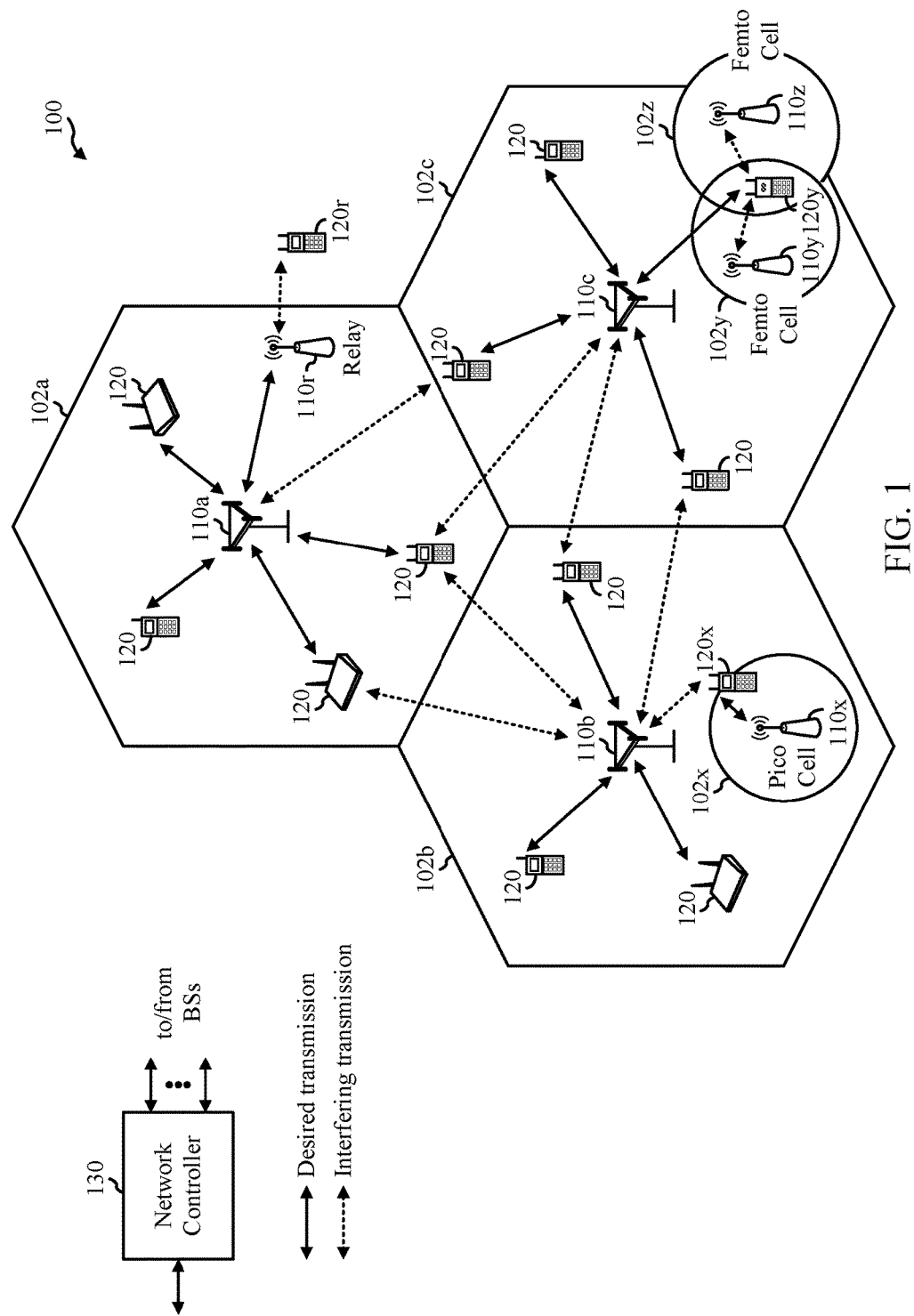
FIG. 1 is a block diagram conceptually illustrating an example telecommunications system, in accordance with certain aspects of the present disclosure.

Aspects of the present disclosure may be used for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. UEs 120 may be configured to perform the operations 800 in FIG. 8 and methods described herein for retransmission of CBGs when CBG level ACK/NACK feedback is unreliable. Further BS 110 may be configured to perform the operations 900 in FIG. 9 and methods described herein for retransmission of CBGs when CBG level ACK/NACK feedback is unreliable. BS 110 may comprise a transmission gNB, reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to an example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
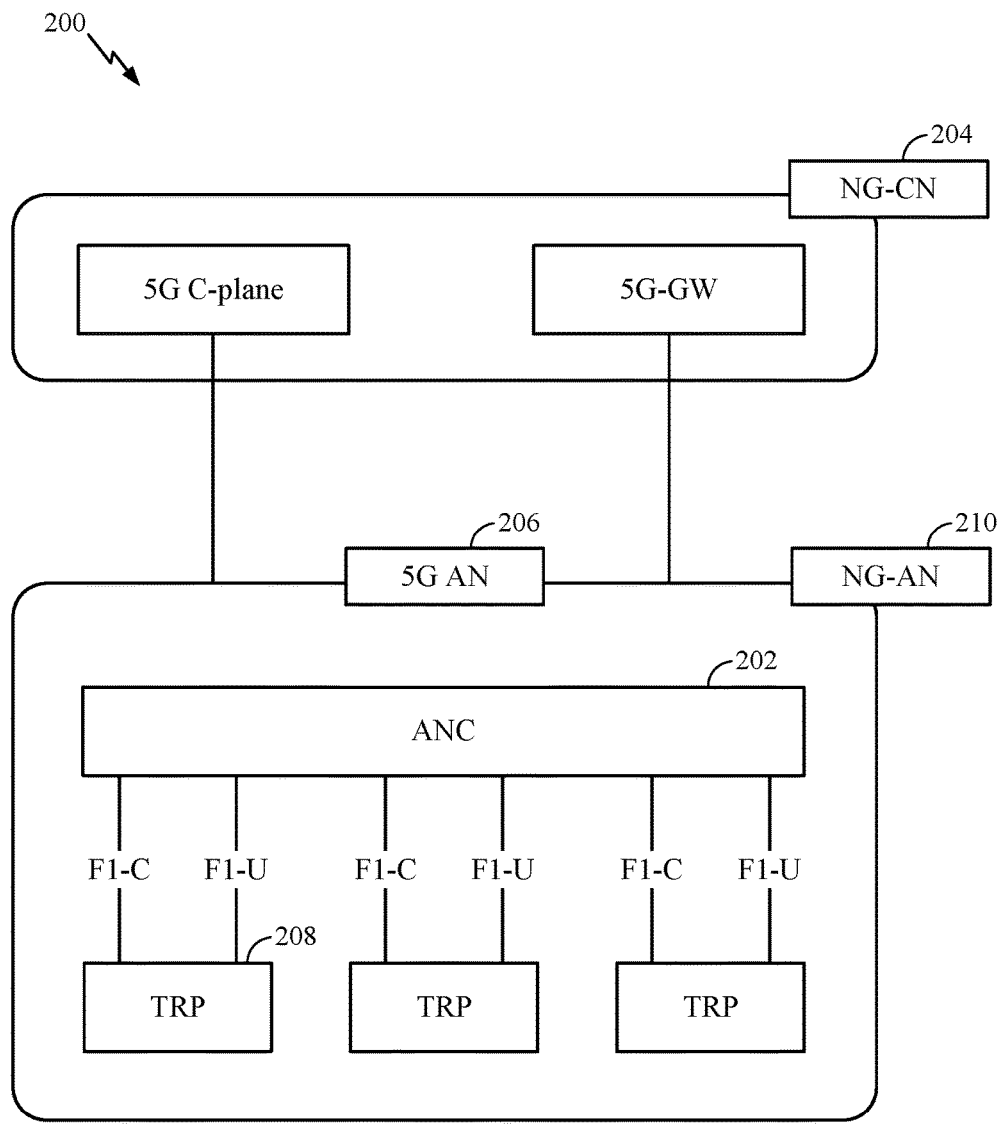
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
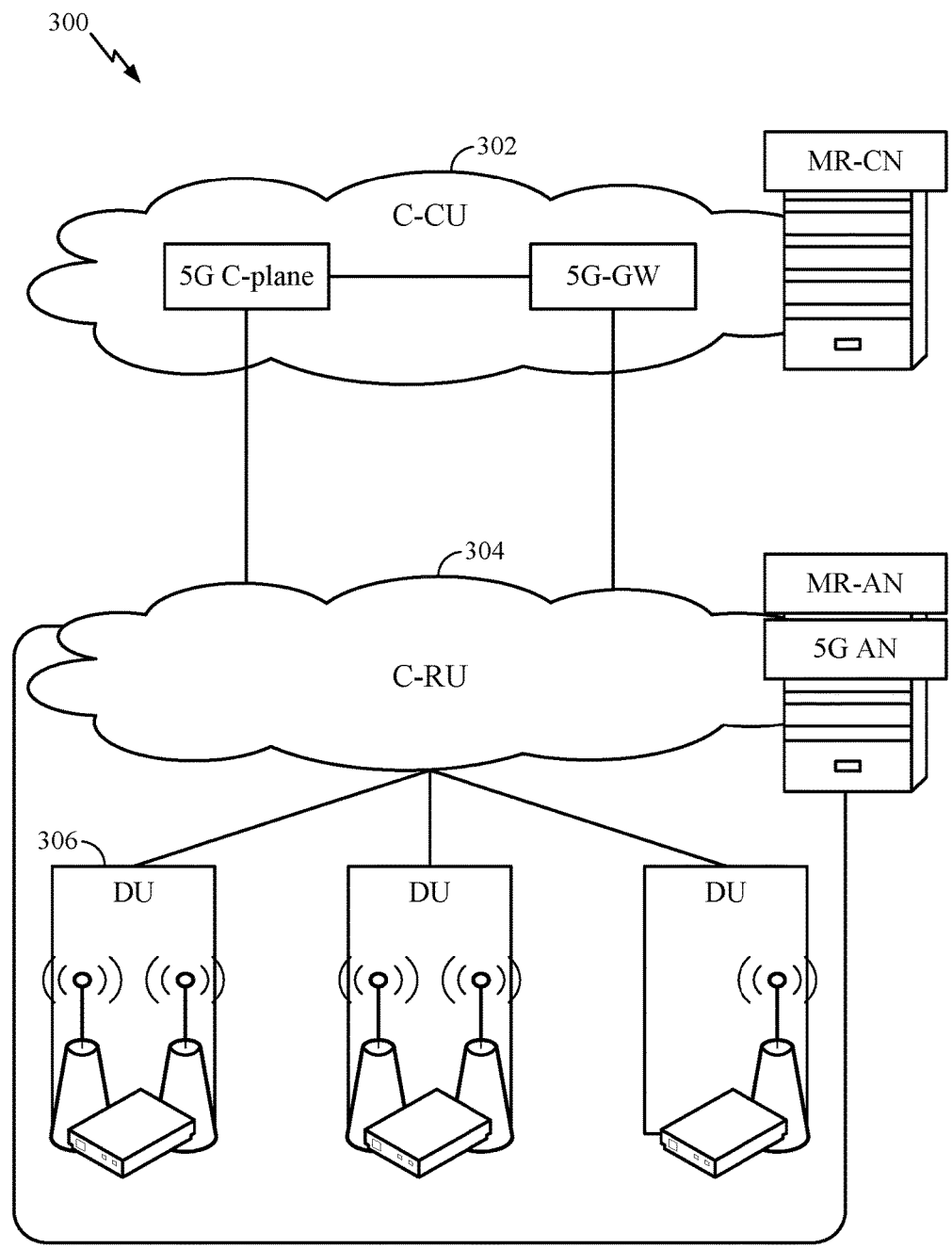
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
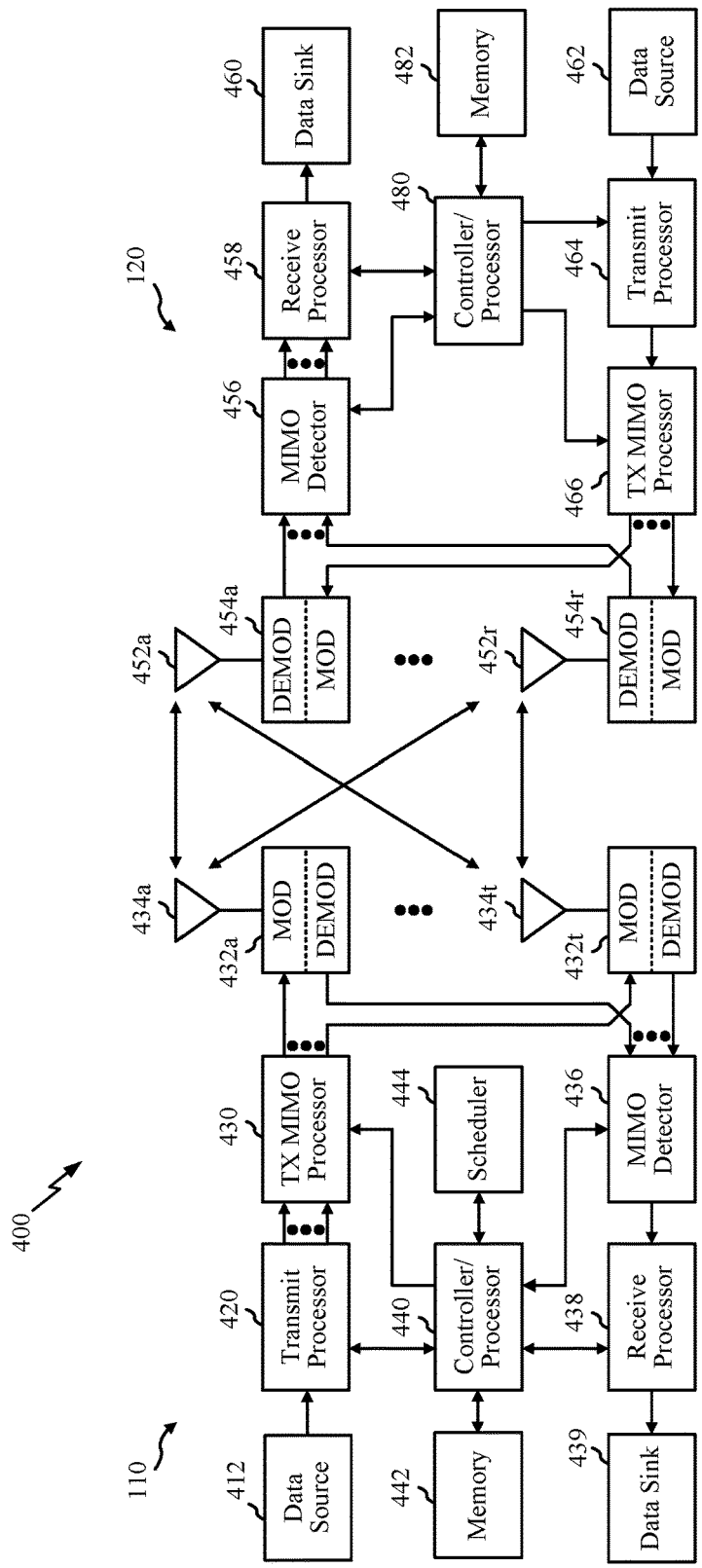
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave frequencies above 6 GHz. The Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 7-13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 may perform or direct, e.g., the execution of the functional blocks illustrated in FIG. 8, and/or other processes for the techniques described herein. The processor 440 and/or other processors and modules at the base station 110 may perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
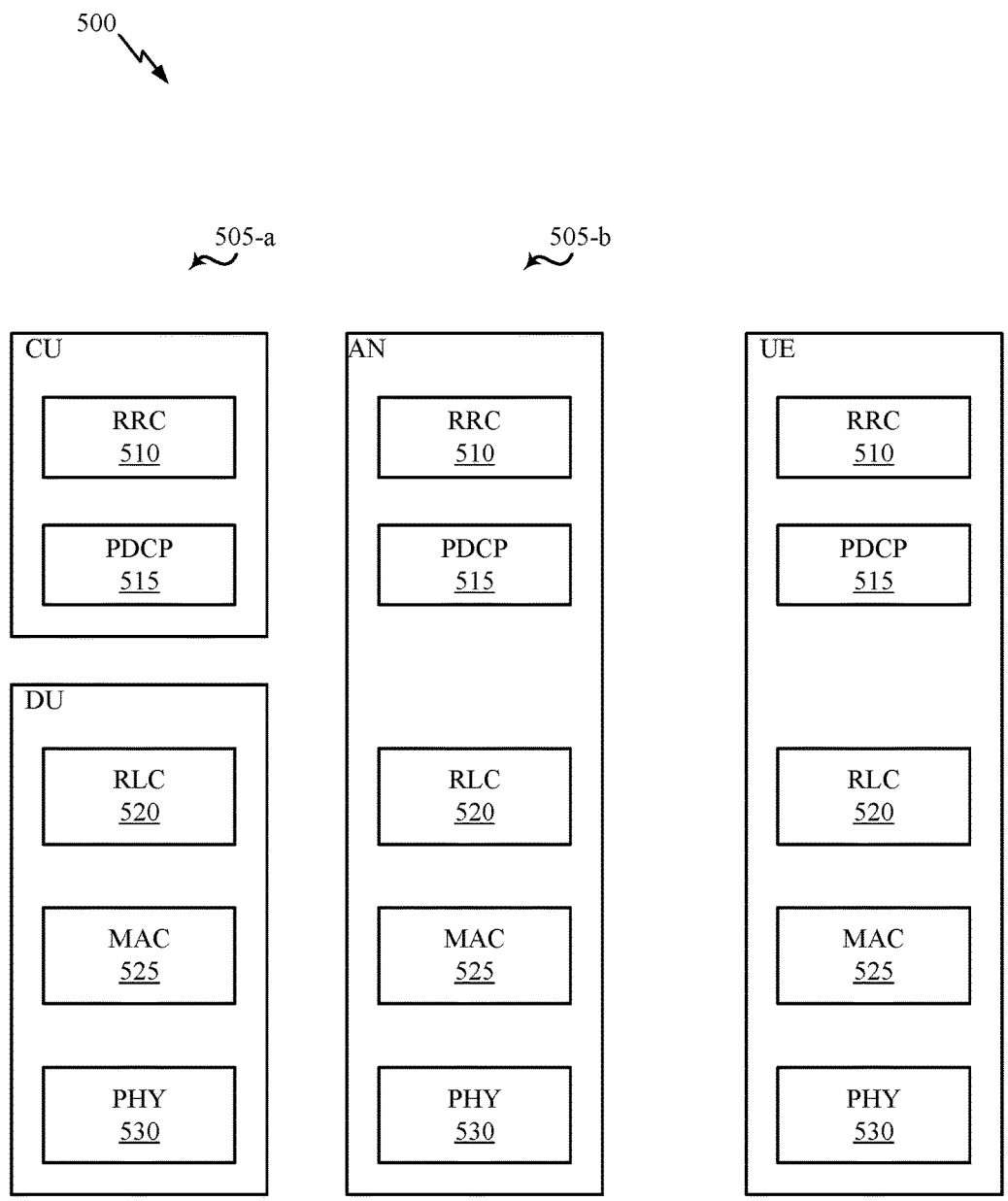
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer

520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6A:
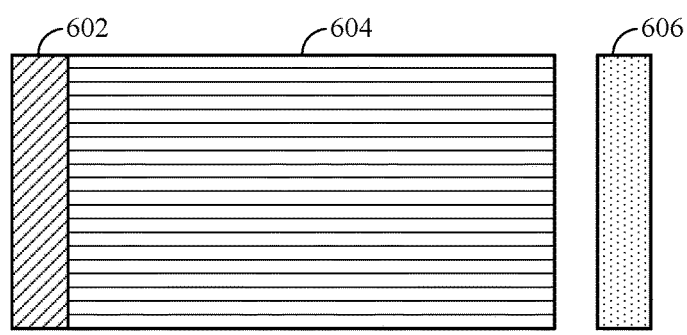
FIG. 6a illustrates an example of a DL-centric subframe, in accordance with certain aspects of the present disclosure.

FIG. 6a is a diagram 6a showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6a. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6a, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6B:
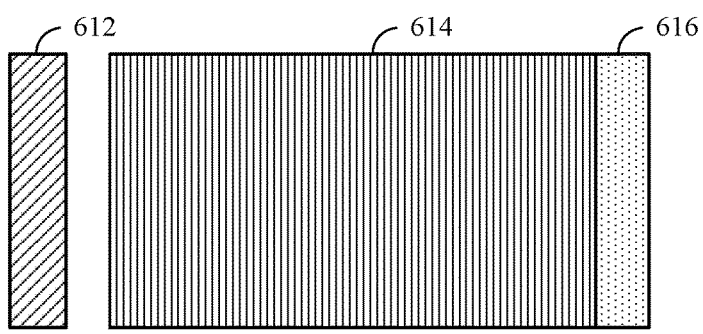
FIG. 6b illustrates an example of an UL-centric subframe, in accordance with certain aspects of the present disclosure.

FIG. 6b is a diagram 6b showing an example of an UL-centric subframe. The UL-centric subframe may include a control portion 612. The control portion 612 may exist in the initial or beginning portion of the UL-centric subframe. The control portion 612 in FIG. 6b may be similar to the control portion described above with reference to FIG. 6a. The UL-centric subframe may also include an UL data portion 614. The UL data portion 614 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 612 may be a physical UL control channel (PUCCH).

As illustrated in FIG. 6b, the end of the control portion 612 may be separated in time from the beginning of the UL data portion 614. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 616. The common UL portion 616 in FIG. 6b may be similar to the common UL portion 616 described above with reference to FIG. 6b. The common UL portion 616 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Methods for Downlink Retransmisison of Code Block Groups Under Unreliable CBG Level ACK/NACK In RAN (Radio Access Network) WG (Working Group) 1 (Shorthand, RAN 1), it was agreed that Code Block Group (CBG) level Acknowledgement (ACK) and Negative Acknowledgement (NACK) feedback is supported. For CBG level ACK/NACK feedback, downlink PDSCH Code Blocks (CBs) in a Transport Block (TB) are collected into Code Block Groups and one ACK/NACK bit is generated and fed back by a receiver (e.g., UE) for each CBG. The gNB may retransmit CBGs corresponding to which it received NACKs, the NACKs indicating that those CBGs were not correctly received by the receiver. Generally, data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (e.g., MIMO), there may be up to two transport blocks per TTI.

Certain designs provide long CRC (Cyclic Redundancy Check) protection for CBG level ACK/NACK feedback and assume that the CBG ACK/NACK feedback from a UE is reliably received by the gNB. Thus, these designs consider erasure events, but do not consider error events in receiving the feedback at the gNB.

However, in 5$^{th}$ Generation (5G) New Radio (NR) design, there is either no CRC or the CRC is not long enough for CBG ACK/NACK feedback resulting in potential errors in receiving the CBG ACK/NACK feedback at the gNB. Thus, when a UE feeds back a CBG ACK/NACK there may be a decoding error at the gNB receiving the feedback and the gNB may retransmit a wrong set of CBGs. For example, a UE may transmit CBG ACK/NACK feedback including NACKs for a set A of CBGs indicating that the CBGs in set A were not received correctly at the UE. The gNB however may incorrectly decode the feedback from the UE and retransmit a different set B of CBGs to the UE. This may lead the UE to combine Log Likelihood Ratios (LLRs) from CBGs in set B with LLRs from CBGs in set A from a previous transmission of the CBGs in set A. This mismatch may result in a failure in decoding one or more set A CBGs. Further, this error may be propagated further since once the wrong LLRs have been combined for a particular CBG, the decoding of that CBG may not pass even with multiple retransmissions of the CBG.

Figure 7A:
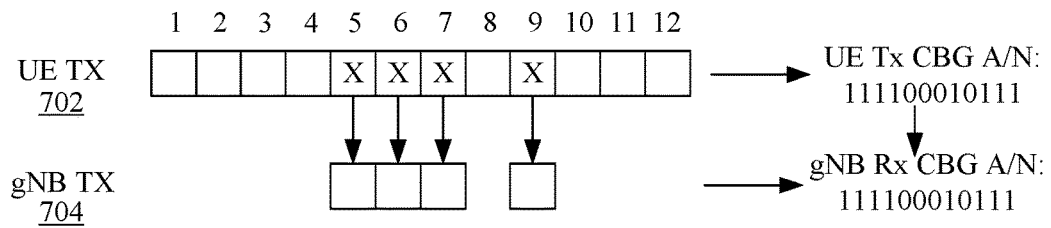
FIG. 7a illustrates a CBG ACK/NACK bitmap from a UE that is correctly received and decoded by the gNB, in accordance with certain aspects of the present disclosure.

FIG. 7a illustrates CBG ACK/NACK feedback (e.g., ACK/NACK bitmap) from a UE that is correctly received and decoded by the gNB, in accordance with certain aspects of the present disclosure. UE TX (Transmission) 702 is the ACK/NACK feedback transmitted by a UE corresponding to a set of CBGs received from the gNB. As shown, as part of the UE TX 702, the UE transmits the ACK/NACK feedback as the bitmap "111100010111" with each '1' representing an ACK and each '0' representing a NACK for a particular CBG. Thus, the ACK/NACK bitmap feedback indicates that the UE did not receive correctly a total of four CBGs at positions 5, 6, 7, and 9. As shown, the gNB correctly receives (RX) and decodes the feedback as "111100010111" and retransmits CBGs at positions 5, 6, 7, and 9 as part of gNB TX 704 in FIG. 7a. As the UE receives the retransmitted CBGs from the gNB, the UE may combine LLRs corresponding to the retransmitted CBGs with corresponding LLRs of the CBGs from a previous transmission in an attempt to decode the CBGs.

Figure 7B:
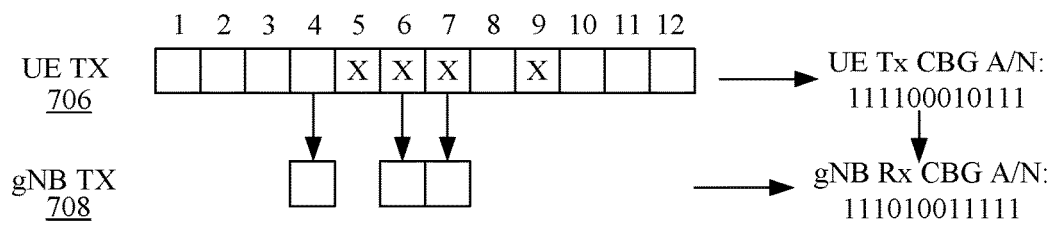
FIG. 7b illustrates a CBG ACK/NACK bitmap from a UE that is incorrectly received and/or decoded by the gNB, in accordance with certain aspects of the present disclosure.

FIG. 7b illustrates CBG ACK/NACK feedback (e.g., ACK/NACK bitmap) from a UE that is incorrectly received and/or decoded by the gNB, in accordance with certain aspects of the present disclosure. As shown, the UE transmits ACK/NACK feedback to the gNB as part of UE TX 706 corresponding to a set of CBGs received from the gNB. As shown, the UE transmits the ACK/NACK feedback as the bitmap "111100010111" with each '1' representing an ACK and each '0' representing a NACK for a particular CBG. So out of the 12 bits that are being fed back, 8 bits are ACK bits. The ACK bits represent the CBGs at positions 1-4, 8, and 10-12 which were correctly decoded. The ACK/NACK bitmap feedback indicates that the UE did not receive correctly a total of four CBGs at positions 5, 6, 7, and 9 by transmitting NACKs corresponding to these CBGs. However, the gNB incorrectly decodes the received ACK/NACK bitmap feedback as "111010011111" (and not 111100010111 as transmitted by the UE) and retransmits CBGs 4, 6, and 7 to the UE as part of gNB TX 708 since these positions in the decoded bitmap are shown as CBG positions with a feedback of a NACK (or zero). Thus, when the UE feeds back a CBG ACK/NACK bitmap and there is a decoding error at the gNB, the gNB may assume a wrong set of CBGs need retransmission. In an aspect, since the UE is expecting to receive a retransmitted CBG 5 as the first retransmitted CBG, the UE may combine LLR of the first retransmitted CBG 4 with LLR of previously received CBG 5 (instead of combining LLRs for a retransmitted CBG 5 with LLR for a corresponding previously received CBG 5) leading to a decoding failure of CBG 5. Further, the gNB does not retransmit CBG 9 because the CBG at position 9 was incorrectly decoded as a ACK or "1", which may also lead to a decoding failure of CBG 9, or a delayed decoding of CBG 9 if the UE requests and awaits another retransmission of CBG 9. Thus, LLR combining for one or more CBGs may be wrong, as the UE may combine LLRs from a retransmitted CBG set B to a soft-buffer of CBG set A where B!=A (i.e., B is not same as A). In an aspect, once wrong LLRs are combined for a particular CBG, the decoding for the CBG will not pass no matter how many retransmissions of the CBG take place in the future.

Certain aspects of the present disclosure discuss techniques for retransmission of CBGs when CBG level ACK/NACK feedback is unreliable. These techniques include the gNB sending an indication to the UE regarding whether a CBG ACK/NACK feedback from the UE was correctly received by the gNB. The UE processes a retransmission of one or more CBGs based on the indication received from the gNB.

Figure 8:
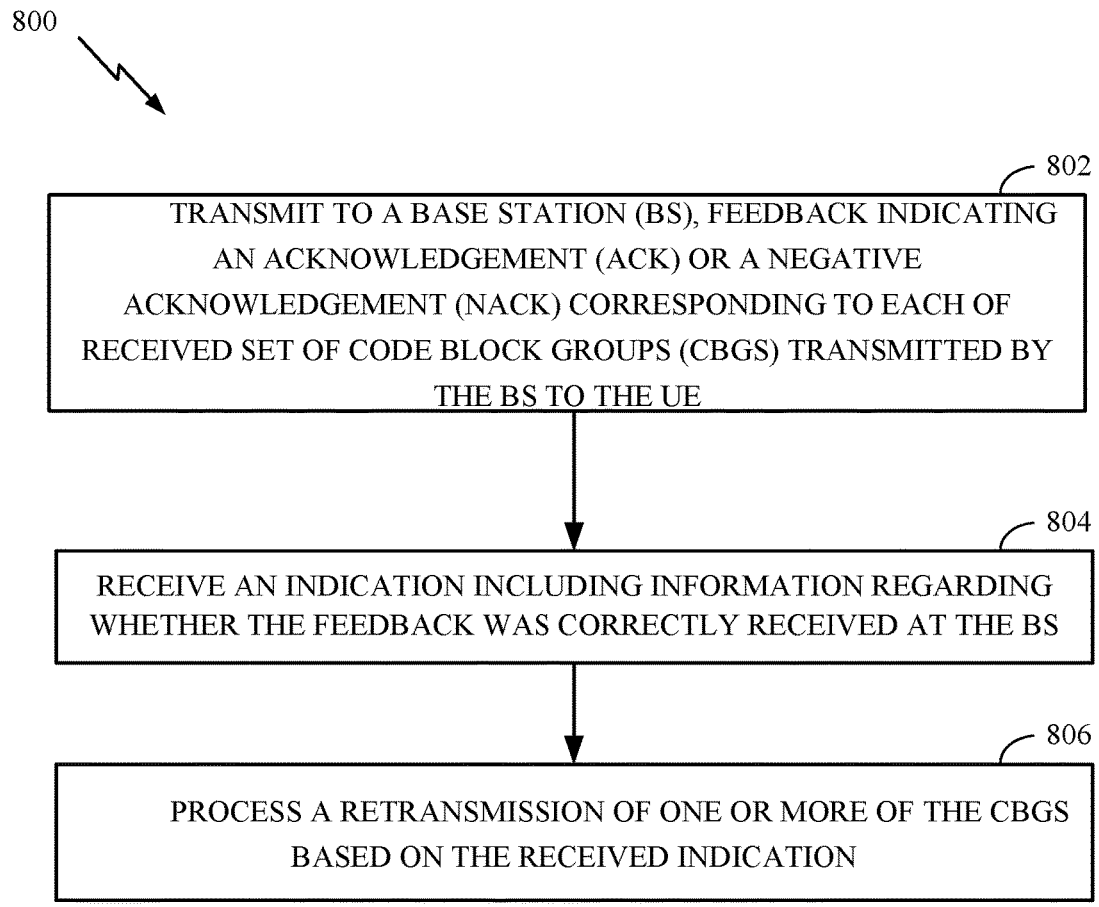
FIG. 8 illustrates example operations 800, performed by a UE, for managing retransmission of CBGs when CBG ACK/NACK feedback is unreliable, in accordance with certain aspects of the present disclosure.

FIG. 8 illustrates example operations 800, performed by a UE, for managing retransmission of CBGs when CBG ACK/NACK feedback is unreliable, in accordance with certain aspects of the present disclosure.

Operations 800 begin, at 802, by transmitting to a Base Station, BS (e.g., gNB), feedback indicating an ACK or a NACK corresponding to each of received set of CBGs transmitted by the BS to the UE. In certain aspects, the CBG ACK/NACK feedback from the UE includes information regarding a first bitmap of ACKs and NACKs corresponding to the CBGs received from the gNB.

At 804, the UE receives an indication including information regarding whether the feedback was correctly received at the BS. For example, the gNB transmits to the UE information regarding a second bitmap of ACKs and NACKs as decoded by the gNB.

At 806, the UE processes a retransmission of one or more of the CBGs based on the received indication. For example, the UE, based on the second bitmap received from the gNB, may determine whether the gNB correctly received and decoded the ACK/NACK feedback, and also ACKs and NACKs corresponding to which CBGs were incorrectly decoded by the gNB. The UE may process retransmitted CBGs re-transmitted by the gNB based on this determination.

Figure 8A:
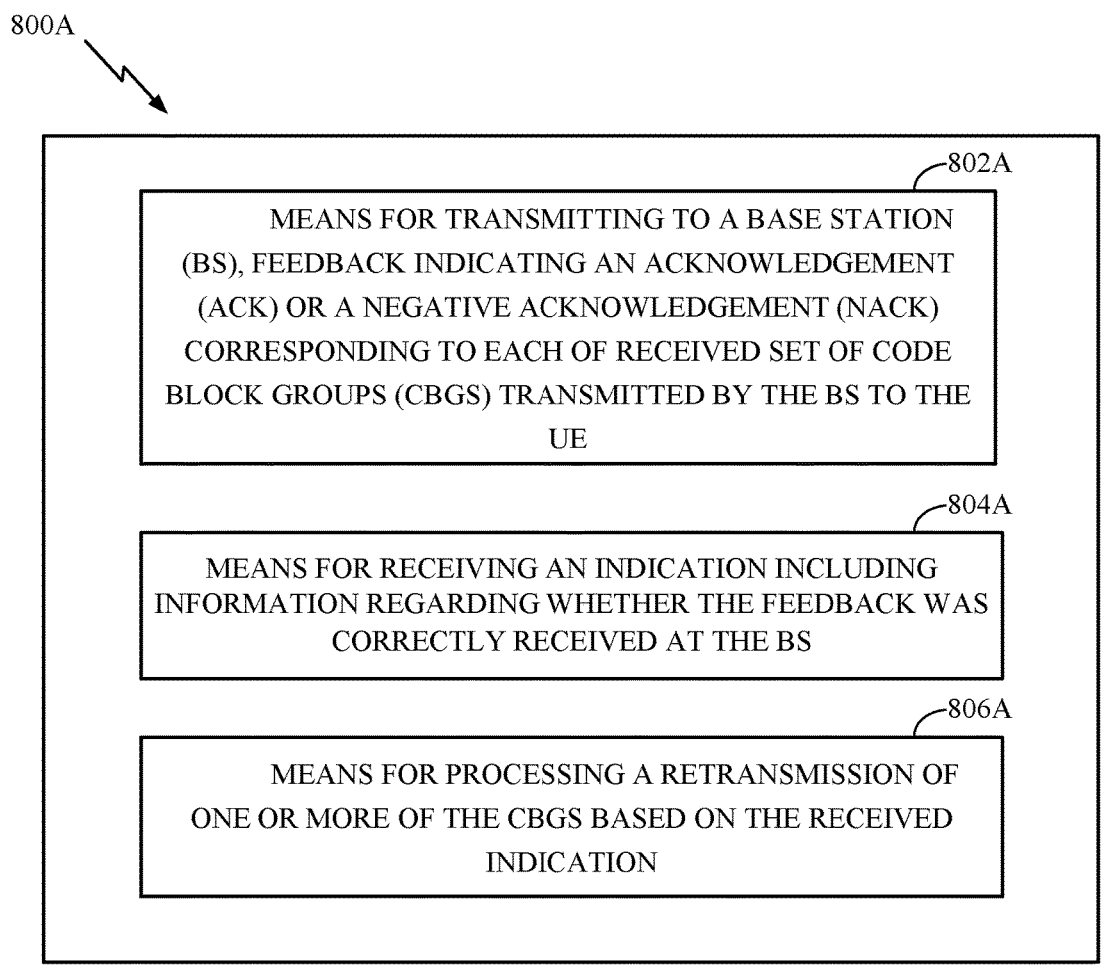
FIG. 8a illustrates a communications device 800A (e.g., UE) that may include various means-plus-function components configured to perform the operations 800 illustrated in FIG. 8.

FIG. 8A illustrates a communications device 800A (e.g., UE) that may include various means-plus-function components configured to perform the operations 800 illustrated in FIG. 8. For example, at 802A, the communications device 800A includes means for performing operations illustrated at 802 in FIG. 8. At 804A, the communications device 800A includes means for performing operations illustrated at 804 in FIG. 8. At 806A, the communications device 800A includes means for performing operations illustrated at 806 in FIG. 8.

Figure 9:
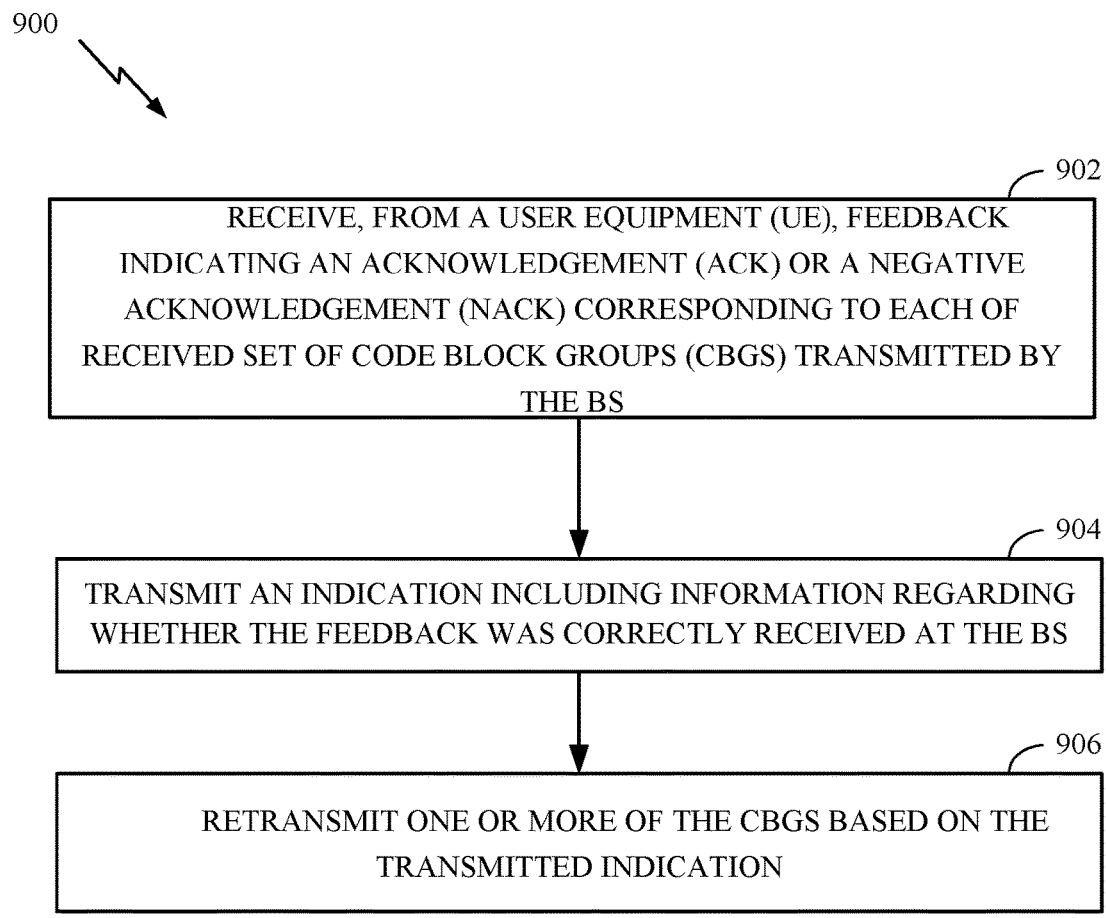
FIG. 9 illustrates example operations 900, performed by a Base Station, BS (e.g., gNB), for managing retransmission of CBGs when CBG ACK/NACK feedback is unreliable, in accordance with certain aspects of the present disclosure.

FIG. 9 illustrates example operations 900, performed by a Base Station, BS (e.g., gNB), for managing retransmission of CBGs when CBG ACK/NACK feedback is unreliable, in accordance with certain aspects of the present disclosure.

Operations 900 begin, at 902, by receiving, from a UE, feedback indicating an ACK or a NACK corresponding to each of received set of CBGs transmitted by the BS. In certain aspects, the CBG ACK/NACK feedback from the UE includes information regarding a first bitmap of ACKs and NACKs corresponding to the CBGs received from the gNB.

At 904, the BS transmits an indication including information regarding whether the feedback was correctly received at the BS. For example, the gNB receives and decodes the information regarding the first bitmap received from the UE and transmits back to the UE information regarding a result of the decoding. For example, the gNB transmits to the UE information regarding a second bitmap of ACKs and NACKs as decoded by the gNB.

At 906, the BS retransmits one or more of the CBGs based on the transmitted indication. For example, the gNB retransmits CBGs corresponding to each NACK decoded by the gNB.

Figure 9A:
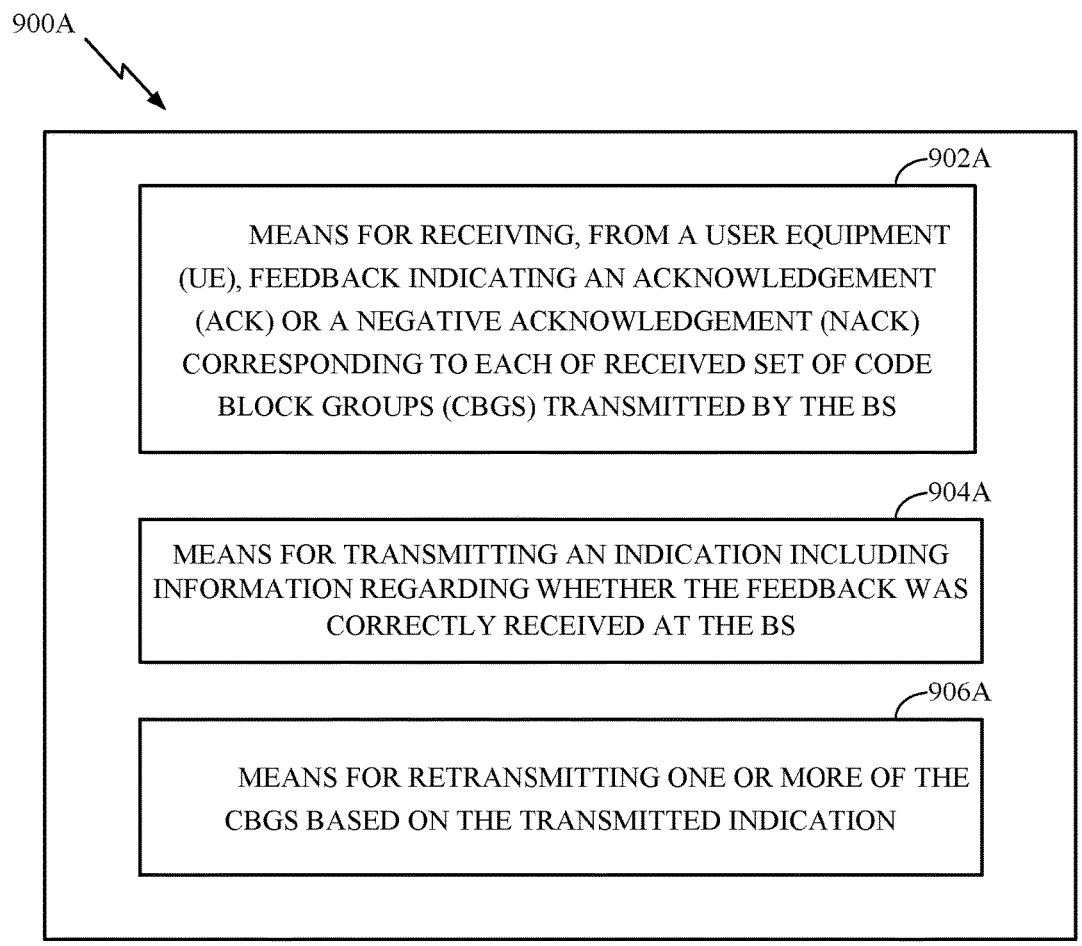
FIG. 9a illustrates a communications device 900A (e.g., gNB) that may include various means-plus-function components configured to perform the operations 900 illustrated in FIG. 9.

FIG. 9A illustrates a communications device 900A (e.g., gNB) that may include various means-plus-function components configured to perform the operations 900 illustrated in FIG. 9. For example, at 902A, the communications device 900A includes means for performing operations illustrated at 902 in FIG. 9. At 904A, the communications device 900A includes means for performing operations illustrated at 904 in FIG. 9. At 906A, the communications device 900A includes means for performing operations illustrated at 906 in FIG. 9.

As noted above, the CBG ACK/NACK feedback from the UE includes information regarding a first bitmap of ACKs and NACKs corresponding to the CBGs received from the gNB. The gNB receives and decodes the information regarding the first bitmap received from the UE and transmits back to the UE information regarding a result of the decoding. For example, the gNB transmits to the UE information regarding a second bitmap of ACKs and NACKs as decoded by the gNB.

The UE, based on the second bitmap received from the gNB, may determine whether the gNB correctly received and decoded the ACK/NACK feedback, and also ACKs and NACKs corresponding to which CBGs were incorrectly decoded by the gNB. In an aspect, the UE compares the second bitmap received from the gNB with the first bitmap it transmitted to the gNB. If the second bitmap is the same as the first bitmap the UE determines that the gNB decoded the ACK/NACK feedback correctly, and continues decoding CBGs retransmitted from the gNB (e.g., based on the second bitmap), for example, by soft combining of LLRs. If the second bitmap is not same as the first bitmap, the UE determines that the gNB was unable to decode the ACK/NACK feedback correctly, and does not use one or more CBGs retransmitted from the gNB (e.g., based on the second bitmap) for decoding.

For example, UE reports to the gNB the CBG ACK/NACK feedback bitmap set A corresponding to a plurality of CBGs received from the gNB. The gNB decodes the bitmap set A received from the UE as ACK/NACK bitmap set B, where it is possible that B!=A (i.e., set B is not same as set A) due to a decoding error at the gNB. The gNB includes the decoded bitmap set B in the next DCI, for example, as part of a DL grant for a retransmission of CBGs, indicating that the PDSCH in the retransmission includes CBGs corresponding to ACK/NACK bitmap set B. For example, the gNB retransmits CBGs corresponding to each '1' (denoting an ACK) in the bitmap set B. The UE decodes the DCI and compares bitmap set B with bitmap set A. Generally, DCI signals the allocation of resources to the UE. For example, the gNB may use the DCI to schedule UL resources on the PUSCH and DL resources on the PDSCH. To decode the data, the UE first decodes the DCI and receives data on the scheduled DL resources and transmits data on the scheduled UL resources indicated in the DCI.

If bitmap set B is the same as bitmap set A, the UE determines that the gNB correctly decoded the bitmap set A and the content of the current retransmission from the gNB is as expected, and the UE continues to decode the CBGs with proper soft combining of LLRs from the retransmission and previous transmissions of the CBGs. In certain aspects, some of the CBGs (e.g., Set C of CBGs) may pass decoding in this round. The UE may request another retransmission of CBGs that still failed decoding in this round (e.g., CBGs in set A, but not in set C).

On the other hand, if bitmap set B is different from bitmap set A, the UE determines that there was a decoding error at gNB and that the gNB incorrectly decoded the bitmap set A, and the content of the current retransmission from the gNB is not as expected. So, the UE may not combine LLRs from CBGs in the current retransmission with LLRs from CBGs in previous transmissions or retransmissions. However, some of the CBGs in set B may happen to be in set A as well (e.g., CBGs in An B). The UE may continue decoding those CBGs with proper soft combining of LLRs. In an aspect, some of the CBGs may pass decoding in this round (e.g., set C of CBGs). In the next round of CBG ACK/NACK feedback, the UE may request retransmission of CBGs that still failed decoding (e.g, in set A but not in set C).

Figure 10A:
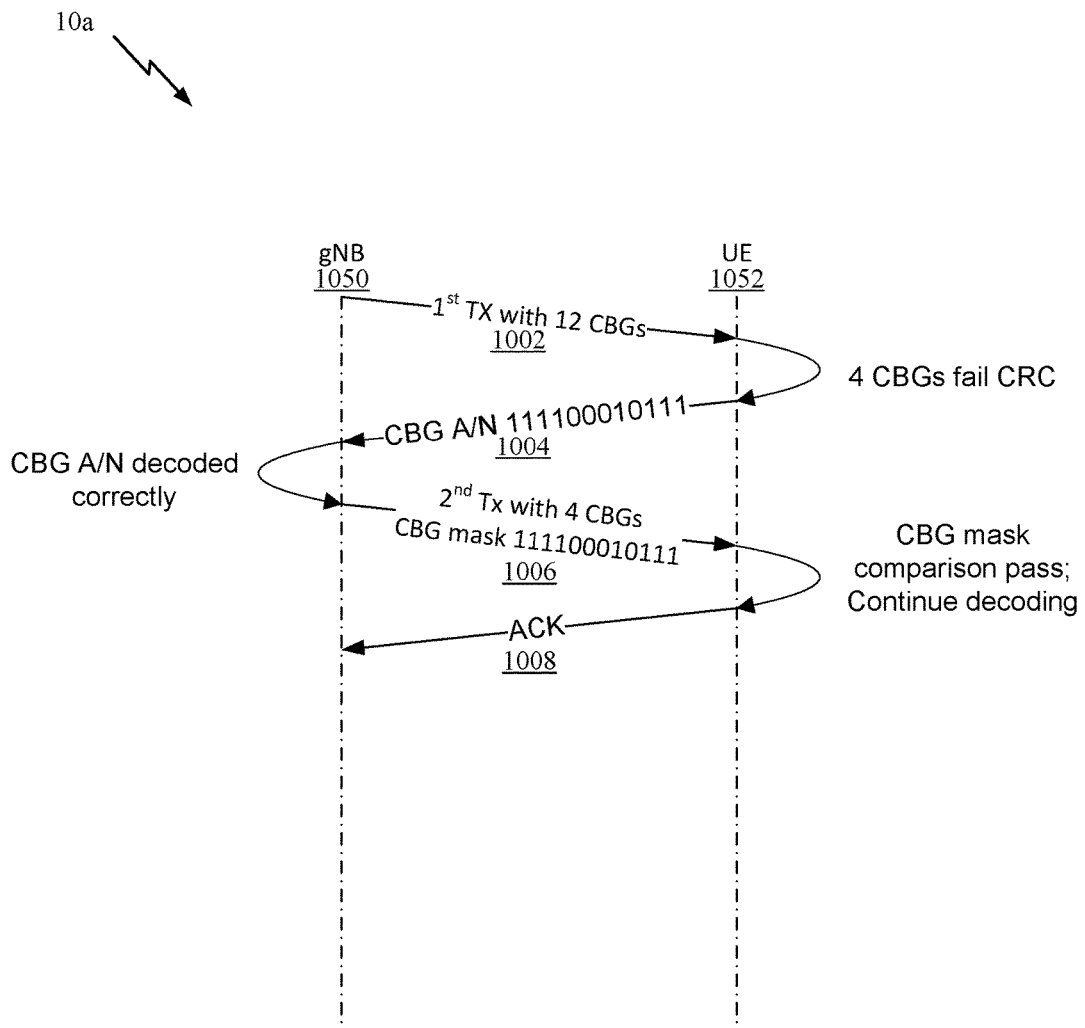
FIG. 10a illustrates messages exchanged between a gNB and a UE when CBG ACK/NACK feedback from a UE is correctly received and decoded by the gNB, in accordance with certain aspects of the present disclosure.

FIG. 10a illustrates messages exchanged between a gNB and a UE when CBG ACK/NACK feedback from the UE is correctly received and decoded by the gNB, in accordance with certain aspects of the present disclosure. As shown, the gNB 1050 transmits a set of 12 CBGs to the UE 1052 at 1002 as part of a 1$^{st}$ TX (Transmission). Four of the 12 CBGs fail CRC at the UE 1052. At 1004, the UE 1052 transmits CBG ACK/NACK feedback to the gNB 1050 including ACK/NACK feedback bitmap "111100010111". Each '1' in the bitmap indicates an ACK and each '0' indicates a NACK. Thus, the bitmap indicates that CBGs 5, 6, 7, and 9 were not correctly decoded by the UE. The ACK/NACK bitmap is correctly decoded by the gNB 1050 and the gNB 1050, at 1006, transmits a result of the decoding including bitmap "111100010111" as part of a 2$^{nd}$ TX. gNB 1050 also retransmits CBGs 5, 6, 7 and 9 based on the decoded bitmap feedback. The UE 1052 compares the bitmap that the UE 1052 transmitted at 1002 with the bitmap received from the gNB 1050. The comparison passes as both bitmaps are the same indicating that the gNB 1050 correctly decoded the ACK/NACK feedback. At 1008, the UE 1052 transmits one or more ACKs acknowledging the receipt of the bitmap at 1006 and/or the retransmitted CBGs received from the gNB. It may be noted that the indication of ACK and NACK may be reversed. For example, each '0' in the bitmap may indicate and ACK and each '1' in the bitmap may indicate a NACK.

Figure 10B:
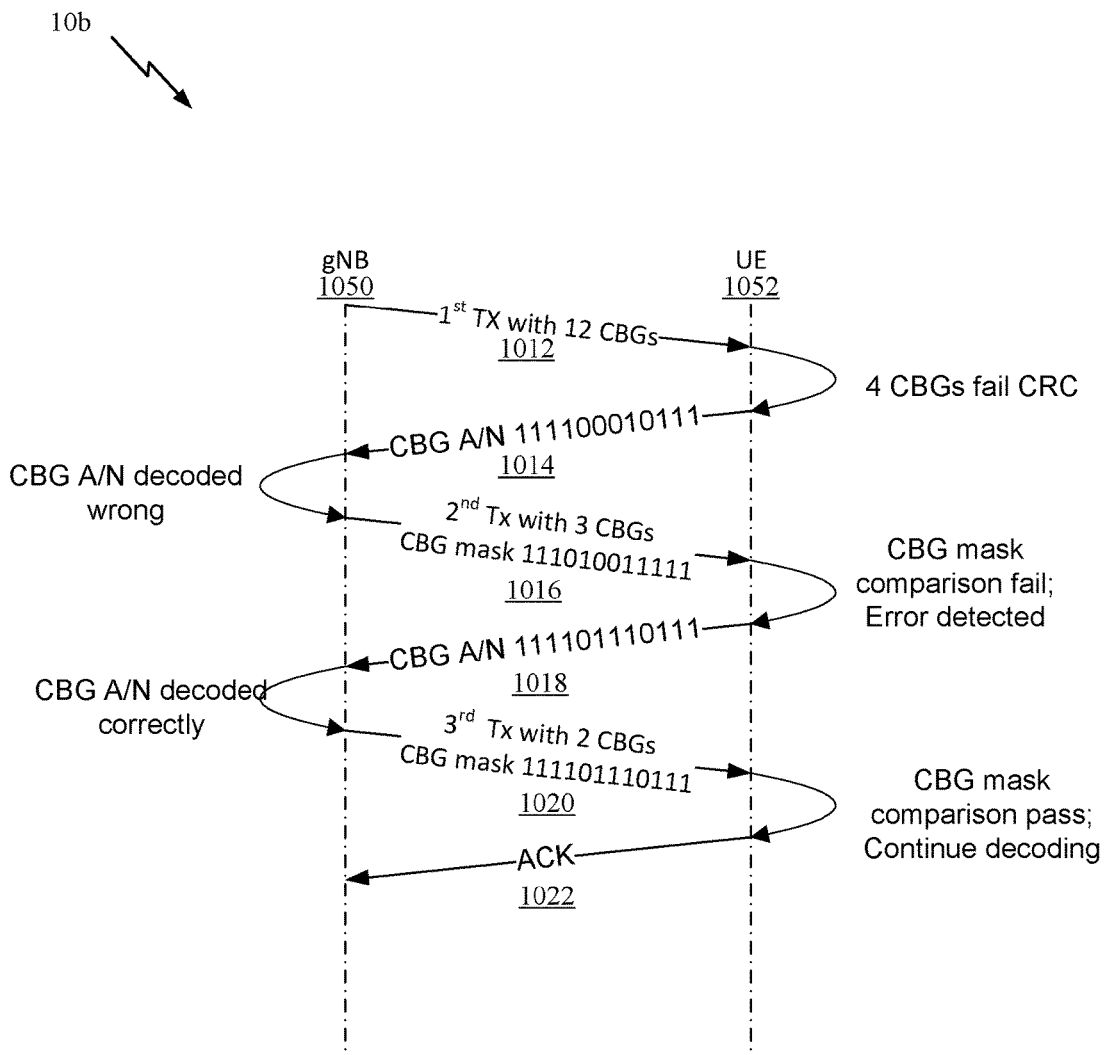
FIG. 10b illustrates messages exchanged between a gNB and a UE when CBG ACK/NACK feedback from a UE is incorrectly received and/or decoded by the gNB, in accordance with certain aspects of the present disclosure.

FIG. 10b illustrates messages exchanged between a gNB and a UE when CBG ACK/NACK bitmap feedback from a UE is incorrectly received and/or decoded by the gNB, in accordance with certain aspects of the present disclosure. As shown, the gNB 1050 transmits a set of 12 CBGs to the UE 1052 at 1012 as part of a 1$^{st}$ TX (Transmission). Four of the 12 CBGs fail CRC at the UE 1052. At 1014, the UE 1052 transmits CBG ACK/NACK feedback to the gNB 1050 including ACK/NACK bitmap "111100010111". Each '1' in the bitmap indicates an ACK and each '0' indicates a NACK. Thus, the bitmap indicates that CBGs 5, 6, 7, and 9 were not correctly decoded by the UE. The ACK/NACK bitmap feedback is incorrectly decoded by the gNB 1050, for example due to a decoding error, and the gNB 1050, at 1016, transmits a result of the decoding including bitmap "111010011111" as part of a 2$^{nd}$ TX. The UE 1052 compares the received bitmap with the bitmap it transmitted at 1012 and determines that there was a decoding error at the gNB 1050 as the two bitmaps do not match. The eNB 1050 also retransmits CBGs 4, 6 and 7 in accordance with the bitmap it transmitted at 1016. The UE 1052 continues to decode CBGs 6 and 7 by soft combining of LLRs. However, the UE 1052 is unable to decode CBGs 5 and 9 as the gNB 1050 did not retransmit these CBGs. At 1018, the UE 1052 transmits another CBG ACK/NACK feedback including bitmap "111101110111" indicating that CBGs 5 and 9 have still not been decoded (e.g., as indicated by '0s' at positions 5 and 9 in the bitmap). The gNB 1050 correctly decodes this bitmap and transmits, at 1020, a result of this decoding including bitmap "111101110111". The UE 1052 compares the bitmap received at 1020 with the bitmap it transmitted at 1018. The UE detects that the two bitmaps are the same and determines that the gNB 1050 correctly decoded the bitmap this time. The UE continues to decode CBGs 5 and 9 by soft combining LLRs and sends one or more ACKs at 1022 to acknowledge the bitmap received at 1020 and/or the retransmitted CBGs received from the gNB.

In certain aspects, the gNB includes information regarding a result of decoding CBG ACK/NACK feedback from a UE in the DCI that schedules retransmission of one or more CBGs (e.g., includes DL grant for the retransmission of the one or more CBGs). For example, the gNB transmits to the UE information regarding a bitmap of ACKs and NACKs in a UE feedback as decoded by the gNB, in the DCI that schedules retransmission of one or more CBGs to the UE, based on the ACK/NACK bitmap as decoded by the gNB. In certain aspects, as a result of including the information regarding the result of decoding CBG ACK/NACK feedback from the UE, the DCI that includes the information may be longer than a regular DCI (e.g., default DCI) used for transmission of transport blocks (TBs). In an aspect, a same length of the DCI is maintained regardless of whether or not the DCI includes the information regarding the result of decoding ACK/NACK feedback from the UE. For example, a DCI not including the information regarding the decoding is zero padded to match a length of the DCI including the information regarding the decoding. A potential benefit of maintaining the same length of the DCI is that the UE may need to perform only one blind decoding for a DCI decoding candidate. However, this design may lead to inefficiencies (e.g., resource wastage) when a DCI transmission does not include information regarding a CBG based retransmission, due to the zero padding.

In certain aspects, two different lengths of the DCI may be maintained. For example, one DCI length (e.g., default DCI length) may be maintained for DCIs for TB based transmission, and another length may be maintained for DCIs that include information regarding CBG based retransmission (e.g., ACK/NACK bitmap of decoded ACK/NACK feedback). This may result in a more efficient DCI delivery as no zero padding is used when sending TB based transmission. However, a problem of this approach is more blind decodings at the UE to decode twice for each decoding candidate. In certain aspects, it is likely that the UE may perform two blind decodings all the time to decode DCI when information regarding at least one CBG ACK/NACK feedback is transmitted by the UE, as the UE may not know when the CBG based retransmission may be granted. The UE may stop decoding the DCI for two different lengths when a new DL grant for the same HARQ process used for CBG ACK/NACK feedback is received.

In certain aspects, the information regarding the result of decoding a CBG ACK/NACK feedback (e.g., decoded ACK/NACK bitmap) may be transmitted in a companion DCI that is different from a DCI (e.g., default DCI) that includes retransmission grant corresponding to one or more CBGs to be retransmitted. In an aspect, the companion DCI may be designed to have the same length as the DCI including the retransmission grant so that the UE may not need to perform multiple blind decodings to decode the DCIs. In an aspect, the default DCI may include an indication of the companion DCI (e.g, including information regarding a search position of the companion DCI) for robustness.

In certain aspects, a problem with including information regarding ACK/NACK bitmap (e.g., including the entire ACK/NACK bitmap itself) in the DCI is that the length of the DCI is increased considerably. This is particularly wasteful when the number of transmitted and/or retransmitted CBGs is large. In certain aspects, instead of sending the entire CBG ACK/NACK bitmap in the DCI, a hash of the CBG ACK/NACK may be transmitted to reduce DCI length, and thus, reduce resource wastage.

Further, in certain aspects, instead of sending the entire CBG ACK/NACK bitmap as feedback, a UE may optionally transmit a hash of the CBG ACK/NACK feedback to reduce resource consumption on the uplink. However, a problem with this approach is that there is a chance of residual error in decoding CBG ACK/NACK feedback at the gNB since all CBG ACK/NACK feedback decoding errors may not be detected at the gNB. For example, this problem may arise when two different CBG ACK/NACK patterns (e.g., ACK/NACK bitmap pattern) map to the same hash. In certain aspects, a length of the hash may be controlled to reduce probability of decoding errors. In an aspect, the hash of a CBG ACK/NACK pattern may include a CRC (e.g., shorter than a regular CRC) generated based on the ACK/NACK pattern to be transmitted to the gNB.

Figure 11A:
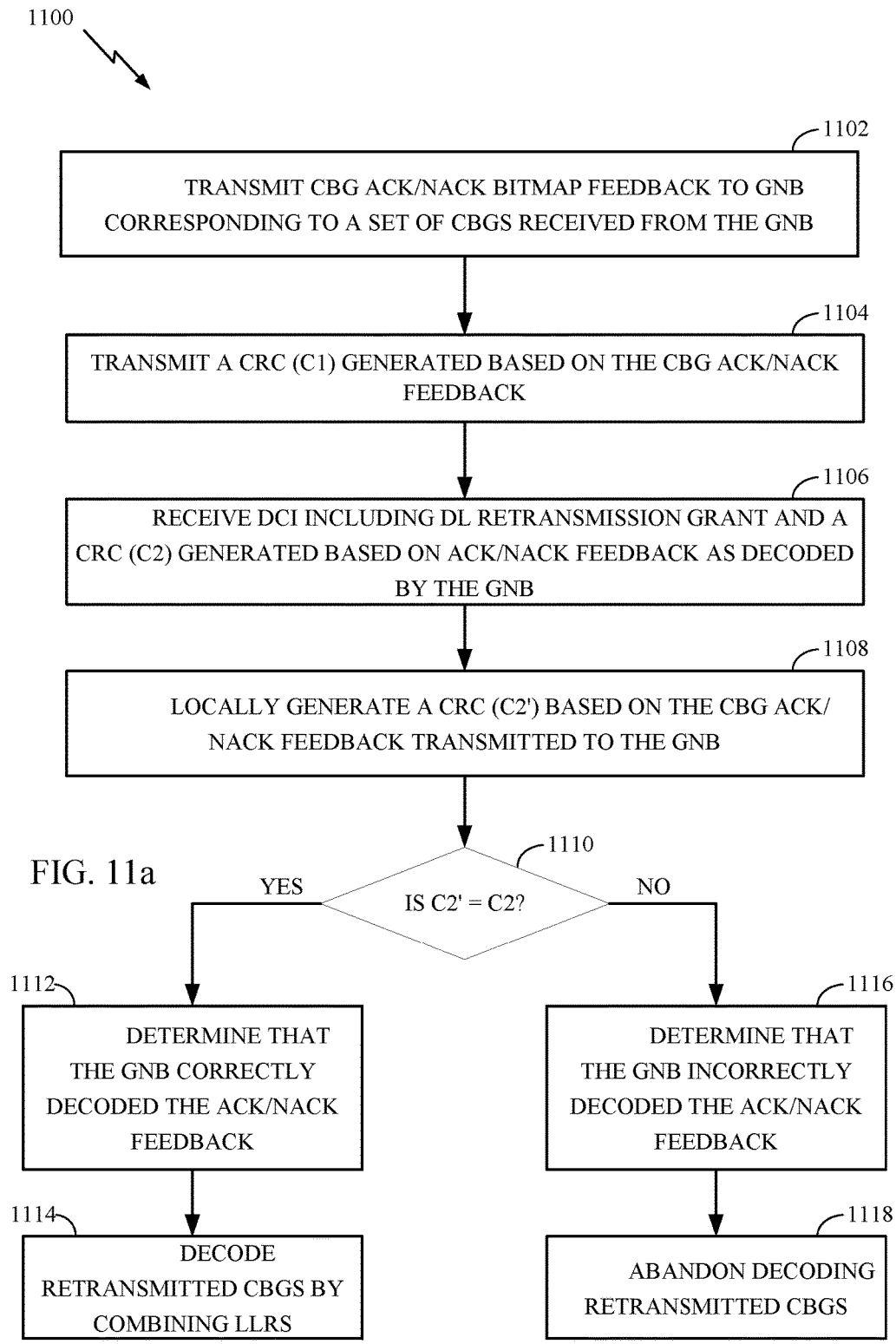
FIG. 11a illustrates example operations performed by a UE, for using hash of CBG ACK/NACK to process retransmission of one or more CBGs, in accordance with certain aspects of the present disclosure.
Figure 11B:
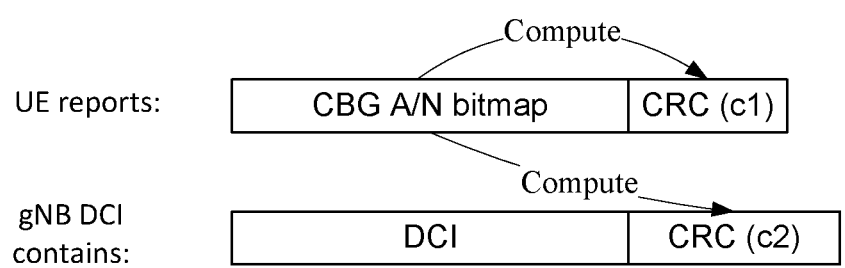
FIG. 11b illustrates transmitting a hash of CBG ACK/NACK for use in retransmitting one or more CBGs, in accordance with certain aspects of the present disclosure.

FIG. 11a illustrates example operations 1100 performed by a UE, for using hash of CBG ACK/NACK to process retransmission of one or more CBGs, in accordance with certain aspects of the present disclosure. FIG. 11b pictorially illustrates transmitting a hash of CBG ACK/NACK for use in retransmitting one or more CBGs, in accordance with certain aspects of the present disclosure.

Operations 1100 begin, at 1102, by transmitting CBG ACK/NACK feedback (e.g., ACK/NACK bitmap) to the gNB corresponding to a set of CBGs received from the gNB. As shown in FIG. 11b, the UE sends CBG ACK/NACK feedback (e.g., ACK/NACK bitmap) to gNB.

At 1104, the UE optionally transmits a CRC (C1) generated based on the CBG ACK/NACK feedback for reducing decoding errors at the gNB. As shown in FIG. 11b, the UE also sends to the gNB, a CRC (C1) generated based on the CBG ACK/NACK feedback to reduce errors in decoding the feedback at the gNB. The gNB receives and decodes the CBG ACK/NACK feedback and verifies the decoding based on the CRC, C1. In certain aspects, C1 may not be too long, and thus, a decoded ACK/NACK feedback may still be wrong in spite of passing the CRC. The gNB schedules CBG based retransmission and includes in the DL grant, another CRC (C2) generated based on the decoded CBG ACK/NACK feedback.

At 1106, the UE receives DCI including DL grant for CBG based retransmissions and a CRC (C2) generated based on the CBG ACK NACK feedback decoded at the gNB. As shown in FIG. 11b, the UE receives the DL grant including the CRC, C2.

At 1108, the UE locally generates a CRC (C2') based on the CBG ACK/NACK feedback it sent to the gNB. In an aspect, for generating C2', the UE uses the same CRC generation function the gNB used to generate C2.

At 1110, the UE compares the locally generated C2' with the C2 received from the gNB. If C2=C2' the UE determines that the gNB correctly decoded the CBG ACK/NACK feedback at 1112 and proceeds with decoding one or more retransmitted CBGs at 1114, for example by combining LLRs of one or more retransmitted CBGs with corresponding LLRs of previously transmitted CBGs. If C2!=C2' (i.e., if C2 is not same as C2'), the UE determines that the gNB incorrectly decoded the CBG ACK/NACK feedback at 1116 and abandons decoding the retransmitted CBGs at 1114 1118.

In certain aspects, as the gNB does not transmit the ACK/NACK bitmap, the UE has no way of knowing ACK or NACKs corresponding to which CBGs were decoded incorrectly and ACK or NACKs corresponding to which CBGs were decoded correctly. So, the UE may not use any of the retransmitted CBGs for decoding, even if some of the retransmitted CBGs expected by the UE were retransmitted. In an aspect, after abandoning the decoding of the retransmitted CBGs, the UE resends the previously sent CBG ACK/NACK feedback to the gNB. Alternatively, the UE sends a TB NACK to the gNB in response to determining that the gNB did not decode the CBG ACK/NACK feedback correctly.

In certain aspects, if both C1 and C2 are used and they are of the same length, C1 and C2 may need to be generated using different CRC generated functions, otherwise a CBG ACK/NACK decoding error may not be detected. For example, a CBG ACK/NACK decoding error at the gNB that passes CRC check C1 implies C1=C2, if same CRC function is used to generate C2. Alternatively, a common CRC generation function of length L1+L2 may be used for generating both C1 and C2, but using the first L1 bits for C1 and the last L2 bits for C2.

In certain aspects, the gNB may embed the decoded CBG ACK/NACK feedback in the CRC transmitted with the DCI. For example, the gNB decodes CBG ACK/NACK feedback pattern A from the UE as CBG ACK/NACK pattern B, where it is possible that B!=A (i.e., B is not same as A) due to decoding error at the gNB. For the CBG retransmission, the gNB generates DCI (e.g., including DL grant for the retransmission) and CRC, and scrambles B into the CRC. Thus, the CRC of the DCI is different for different decoded ACK/NACK patterns B. The UE decodes the DCI (e.g., blind decoding), and scrambles A into a CRC locally generated from the decoded DCI, using a method similar to the method used by the gNB to generate the CRC. The UE then compares the locally generated CRC with the CRC received from the gNB. If the CRC comparison passes (e.g., if the CRCs match) the UE interprets the blind decoding result as a valid grant. The passing of the CRC comparison verifies that that A=B and that the CBG ACK/NACK feedback was correctly by the gNB, and that the content of the current retransmission PDSCH is as expected. The UE continues decoding one or more retransmitted CBGs with proper soft combining of LLRs. On the other hand, if the CRC comparison fails the UE may simply skip the blind decoding and may not see the grant at all.

From the gNB's perspective, when B=A, the UE will respond to the DL grant and the gNB sees another CBG ACK/NACK pattern as a response. This confirms the decoded B was correct. When B!=A (i.e., if B is not same as A), the UE is not able to detect the grant and the gNB does not see any CBG ACK/NACK pattern from the UE as a response. This indicates to the gNB that the previously decoded B was wrong. In an aspect, in this case, the gNB may fall back to a TB level retransmission.

Figure 12A:
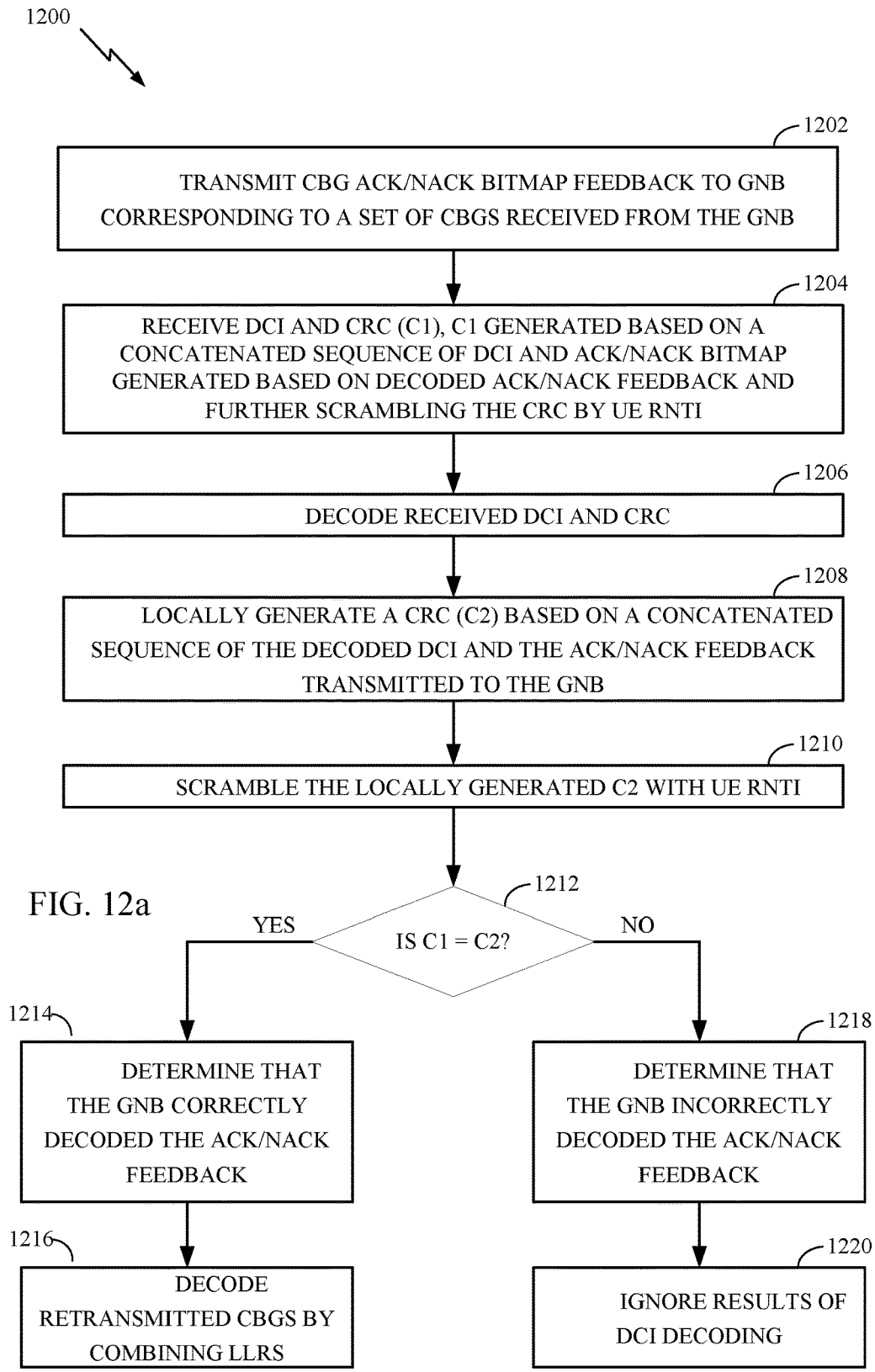
FIG. 12a illustrates example operations by a UE, for a first technique of using embedded CBG ACK/NACK pattern in DCI to process retransmitted CBGs, in accordance with certain aspects of the present disclosure.
Figure 12B:
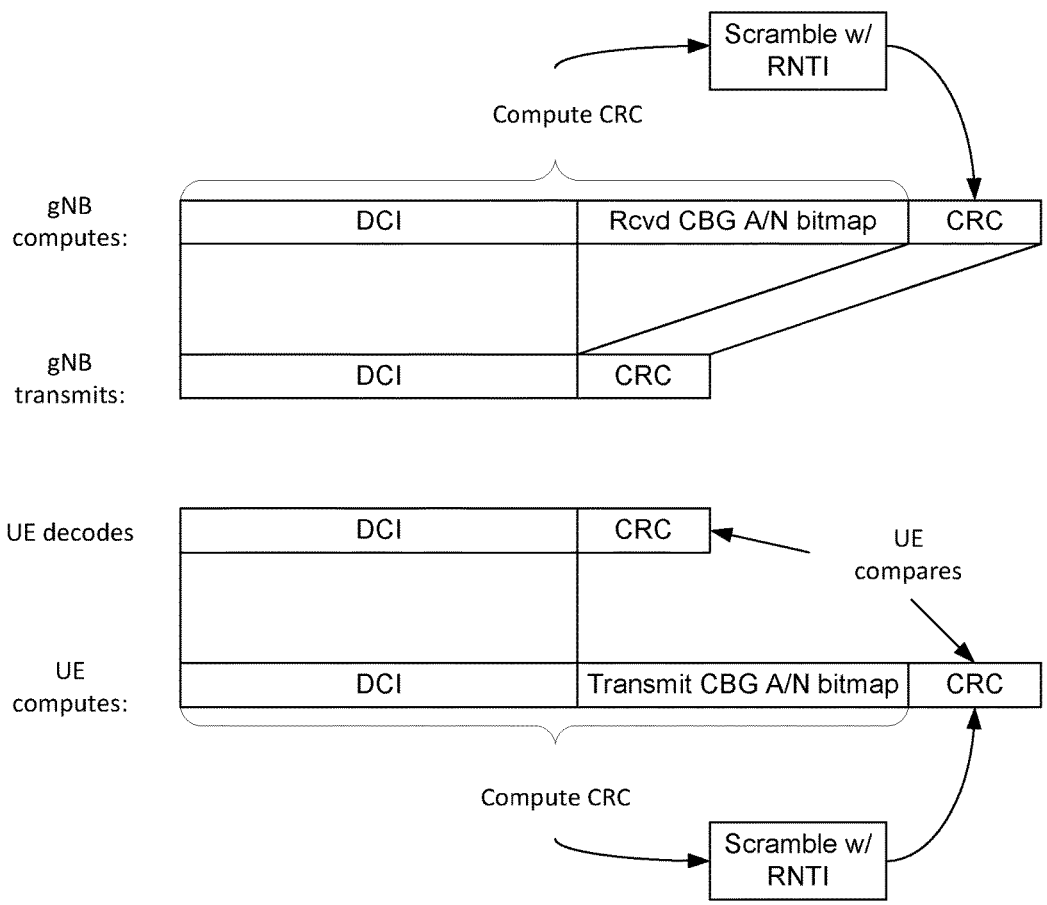
FIG. 12b illustrates a first technique for embedding decoded CBG ACK/NACK pattern in DCI CRC by a gNB for use in retransmitting one or more CBGs, in accordance with certain aspects of the present disclosure.

FIG. 12a illustrates example operations 1200 by a UE, for a first technique of using embedded CBG ACK/NACK pattern in DCI to process retransmitted CBGs, in accordance with certain aspects of the present disclosure. FIG. 12b pictorially illustrates the first technique for embedding decoded CBG ACK/NACK pattern in DCI CRC by a gNB for use in retransmitting one or more CBGs, in accordance with certain aspects of the present disclosure.

Operations 1200 begin, at 1202, by transmitting CBG ACK/NACK feedback (e.g., ACK/NACK bitmap) to the gNB corresponding to a set of CBGs received from the gNB. As shown in FIG. 12b, the gNB generates a DCI and concatenates the DCI with the decoded CBG ACK/NACK bitmap feedback received from the UE. The gNB then generates a CRC using the concatenated sequence of the DCI and the decoded CBG ACK/NACK bitmap. The gNB scrambles the generated CRC with an identity of the UE (e.g., RNTI) and transmits the DCI and the CRC, without the CBG ACK/NACK bitmap part.

At 1204, the UE receives DCI (e.g, scheduling retransmission of CBGs) and a CRC (C1), C1 generated based on a concatenated sequence of the DCI and an ACK/NACK bitmap as decoded by the gNB and further scrambled by UE RNTI. At 1206, the UE decodes the received DCI and CRC.

At 1208, the UE locally generates another CRC (C2) based on a concatenated sequence of the decoded DCI and the ACK/NACK bitmap feedback transmitted to the gNB. In an aspect, the UE generates C2 using a method similar to the method used by the gNB to generate C1.

At 1210, the UE scrambles the locally generated C2 with the UE RNTI.

At 1212, the UE compares the locally generated C2 with the received C1. If the CRCs match (e.g., the CRCs are the same), the UE determines that the ACK/NACK feedback was correctly decoded by the gNB at 1214 and proceeds to decode one or more retransmitted CBGs by proper soft combining at 1216. As noted above, the passing of the CRC comparison verifies the CBG ACK/NACK feedback was correctly decoded by the gNB, and that the content of the current retransmission PDSCH is as expected. The UE continues decoding one or more retransmitted CBGs with proper soft combining of LLRs.

If the CRCs do not match, the UE determines that the ACK/NACK feedback was incorrectly decoded by the gNB at 1218 and ignores the results of the DCI decoding at 1220. As noted above, if the CRC comparison fails, the UE may not even see the grant transmitted as part of the DCI.

Figure 13A:
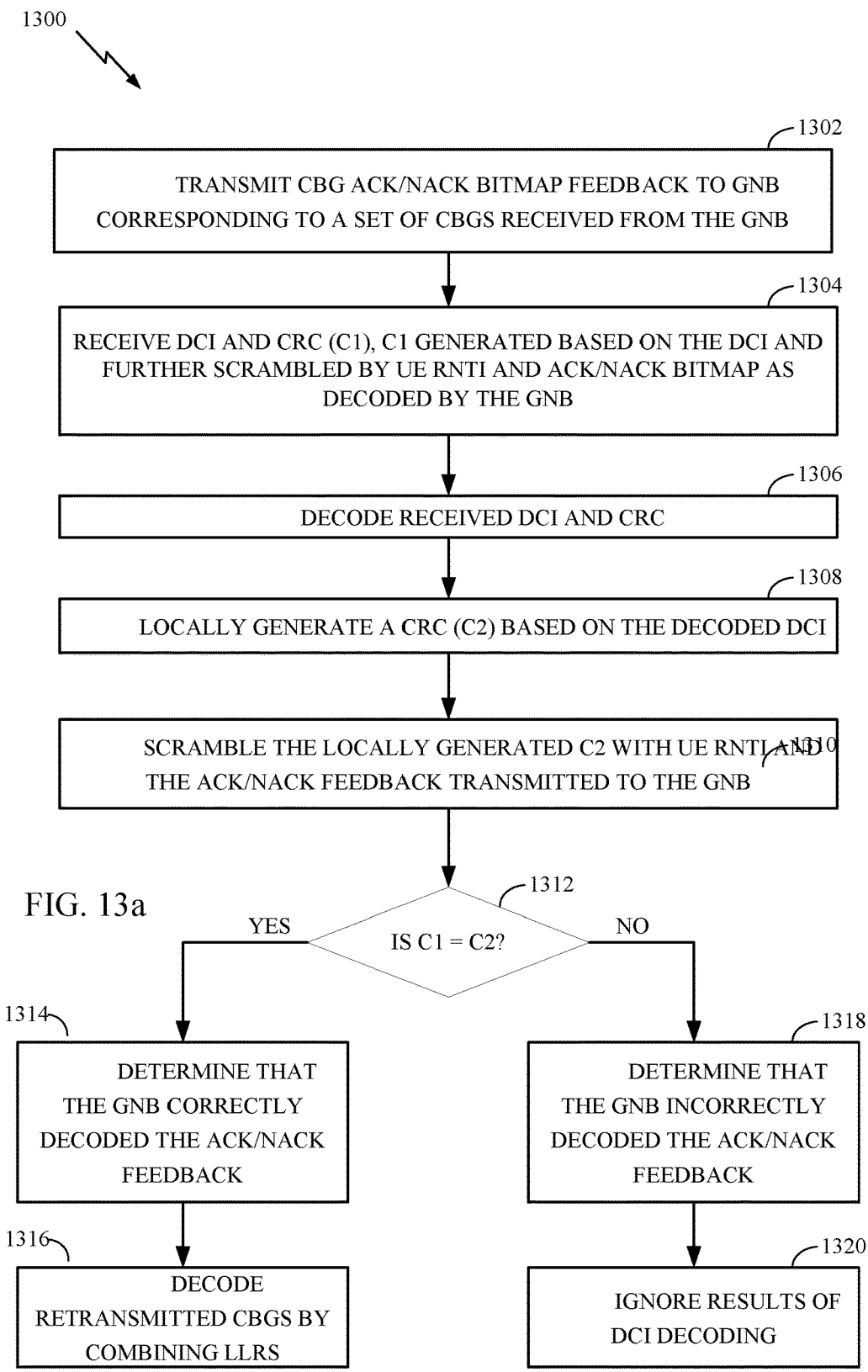
FIG. 13a illustrates example operations by a UE, for a second technique of using embedded CBG ACK/NACK pattern in DCI to process retransmitted CBGs, in accordance with certain aspects of the present disclosure.
Figure 13B:
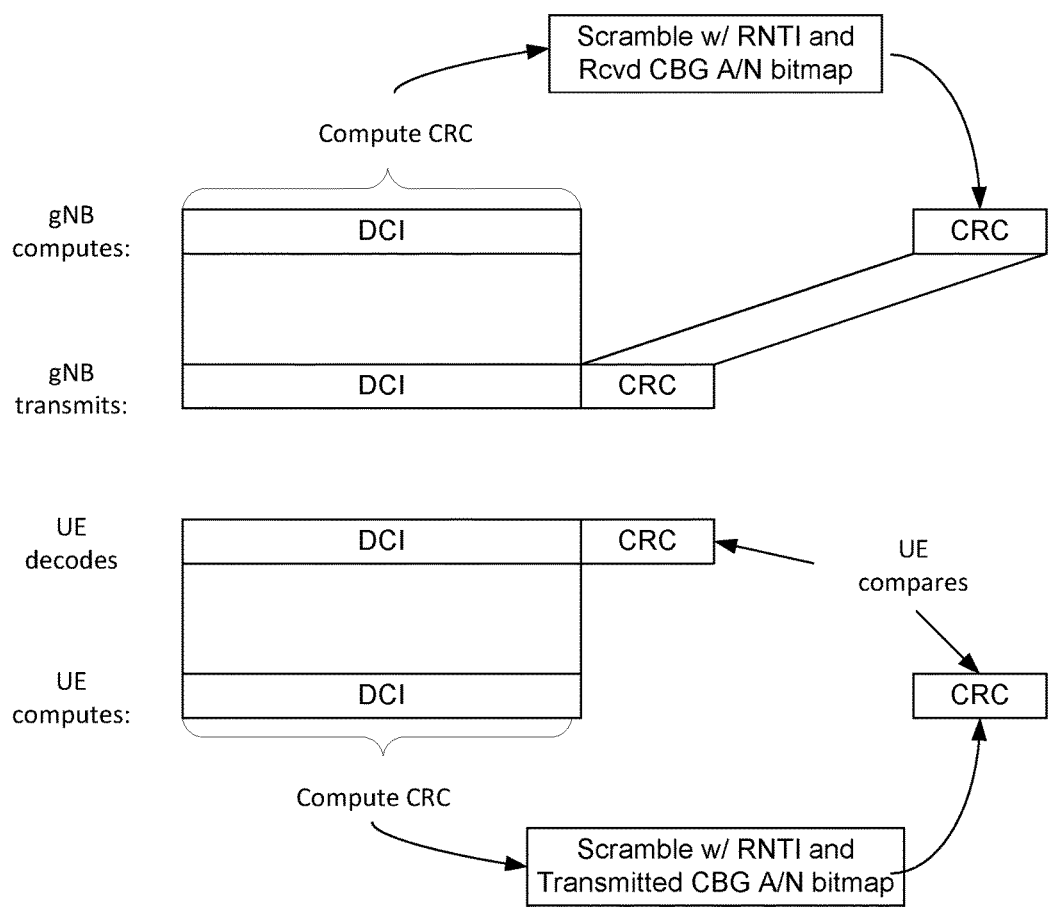
FIG. 13b illustrates a second technique for embedding decoded CBG ACK/NACK pattern in DCI CRC by a gNB for use in retransmitting one or more CBGs, in accordance with certain aspects of the present disclosure.

FIG. 13*a* illustrates example operations 1300 by a UE, for a second technique of using embedded CBG ACK/NACK pattern in DCI to process retransmitted CBGs, in accordance with certain aspects of the present disclosure. FIG. 13*b* pictorially illustrates the second technique for embedding decoded CBG ACK/NACK pattern in DCI CRC by a gNB for use in retransmitting one or more CBGs, in accordance with certain aspects of the present disclosure.

Operations 1300 begin, at 1302, by transmitting CBG ACK/NACK feedback (e.g., ACK/NACK bitmap) to the gNB corresponding to a set of CBGs received from the gNB. As shown in FIG. 13*b*, the gNB generates a DCI and generates a CRC (C1) using the DCI. The gNB then scrambles the CRC with an identity of the UE (e.g., RNTI) and further scrambles the CRC with the CBG ACK/NACK bitmap (or a function thereof) as decoded by the gNB. As shown, the gNB transmits the DCI and the scrambled CRC (C1).

At 1304, the UE receives DCI (e.g, scheduling retransmission of CBGs) and a CRC (C1), C1 generated based on the DCI and further scrambled by UE RNTI and an ACK/NACK bitmap as decoded by the gNB.

At 1306, the UE decodes the received DCI and CRC.

At 1308, the UE locally generates another CRC (C2) based on the decoded DCI. In an aspect, the UE generates C2 using a method similar to the method used by the gNB to generate C1.

At 1210, the UE scrambles the locally generated C2 with the UE RNTI and the ACK/NACK bitmap feedback transmitted to the gNB. In certain aspects, there are different ways to scramble the CBG ACK/NACK bitmap on the CRC (e.g., at the gNB and the UE). If CBG ACK/NACK bitmap is no longer than the CRC length, a straight forward way is direct scramble. On the other hand, if CBG ACK/NACK bitmap is longer, some kind of hashing may need to be performed.

At 1312, the UE compares the locally generated C2 with the received C1. If the CRCs match (e.g., the CRCs are the same), the UE determines that the ACK/NACK feedback was correctly decoded by the gNB at 1314 and proceeds to decoded one or more retransmitted CBGs by proper soft combining at 1316. As noted above, the passing of the CRC comparison verifies the CBG ACK/NACK feedback was correctly decoded by the gNB, and that the content of the current retransmission PDSCH is as expected. The UE continues decoding one or more retransmitted CBGs with proper soft combining of LLRs.

If the CRCs do not match, the UE determines that the ACK/NACK feedback was incorrectly decoded by the gNB at 1318 and ignores the results of the DCI decoding at 1320. As noted above, if the CRC comparison fails, the UE may not even see the grant transmitted as part of the DCI.

In certain aspects, the gNB knows the reason for a failure in decoding at the UE of one or more CBGs transmitted to the UE. For example, when eMBB (enhanced Mobile Broadband) and URLL (Ultra-Reliable and Low Latency Communications) coexist, the gNB may puncture some resources assigned for the PDSCH of an eMBB UE to serve a URLLC UE. In such a case, many samples of CBGs are punctured leading to failed reception of the CBGs at the UE. Thus, the LLRs collected for many bits corresponding to the failed CBGs are not valid. Further soft combining with LLRs from a retransmission of the failed CBGs may not be helpful. Thus, in certain aspects, the UE may erase (e.g., reset) the wrongly collected LLRs for certain CBGs (e.g, due to the puncturing) and start LLR collection for those CBGs afresh. However, the UE does not know that the LLRs corresponding to certain CBGs received at the UE are bad.

In certain aspects, the gNB may include an indicator to the UE to stop soft combining of LLRs corresponding to one or more CBGs in the retransmission grant. In an aspect, the gNB knows beforehand that LLRs corresponding to the one or more CBGs are bad due to puncturing of resources used to transmit the CBGs.

In certain aspects, in CBG based retransmission, the DCI may include at least one bit (e.g., LLR reset indicator bit(s)) to indicate to the UE that the LLR combination is to be stopped for one or more CBGs received by the UE and LLR collection for the CBGs is to be reset. In an aspect, the "NDI" (New Data Indicator) bit may be reinterpreted as an indicator for an LLR reset. In response, the UE may abandon the collected LLRs for the one or more CBGs in the retransmission and start LLR collection afresh. This technique may be used when the gNB knows that some or all the CBGs in the retransmission were damaged by puncturing in a previous transmission and invalid LLR values were collected by the UE.

In certain aspects, the NDI bit used in LTE may be used to transmit the LLR reset indicator in NR. In certain aspects, for CBG based retransmission or any retransmission, by definition the NDI bit is not defined and/or used in NR. So, the NDI bit may be used in NR to send the LLR reset indicator. In this way, the DCI length of an initial grant and a retransmission grant may be the same. This technique assumes that the UE is able to recognize a CBG based retransmission. In an aspect, this design works with CBG ACK/NACK embedded in CRC.

Figure 14:
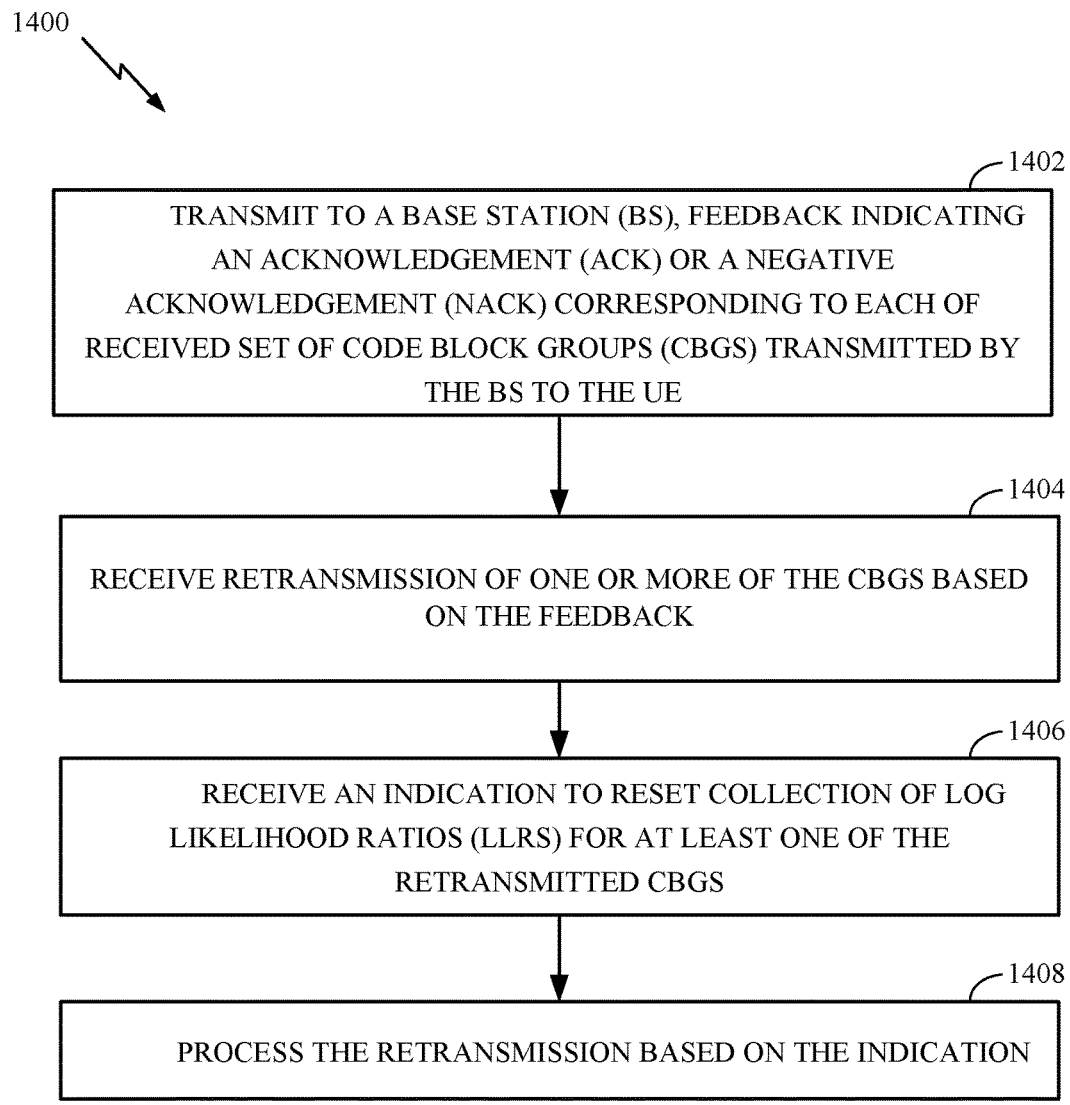
FIG. 14 illustrates example operations 1400 performed by a UE for resetting LLRs of one or more retransmitted CBGs, in accordance with certain aspects of the present disclosure.

FIG. 14 illustrates example operations 1400 performed by a UE for resetting LLRs of one or more retransmitted CBGs, in accordance with certain aspects of the present disclosure.

Operations 1400 begin, at 1402, by transmitting to a base station, feedback indicating an ACK or a NACK corresponding to each of received set of CBGs transmitted by the BS (e.g., gNB) to the UE. In an aspect, the feedback includes an ACK/NACK bitmap as described in the above paragraphs.

At 1404, the UE receives retransmission of one or more of the CBGs based on the feedback. In an aspect, the gNB receives and decodes the ACK/NACK feedback from the UE. The gNB retransmits a CBG corresponding to each NACK decoded by the gNB.

At 1406, the UE receives an indication to reset collection of LLRs for at least one of the retransmitted CBGs. In an aspect, the gNB knows beforehand that LLRs corresponding to one or more CBGs are bad due to puncturing of resources used to transmit the CBGs. The gNB may transmit an indicator to the UE to stop soft combining of LLRs corresponding to the one or more CBGs in a retransmission grant.

At 1408, the UE processes the retransmission based on the indication. In an aspect, the UE, based on the indication, may abandon the collected LLRs for the one or more CBGs in the retransmission and start LLR collection afresh.

Figure 14A:
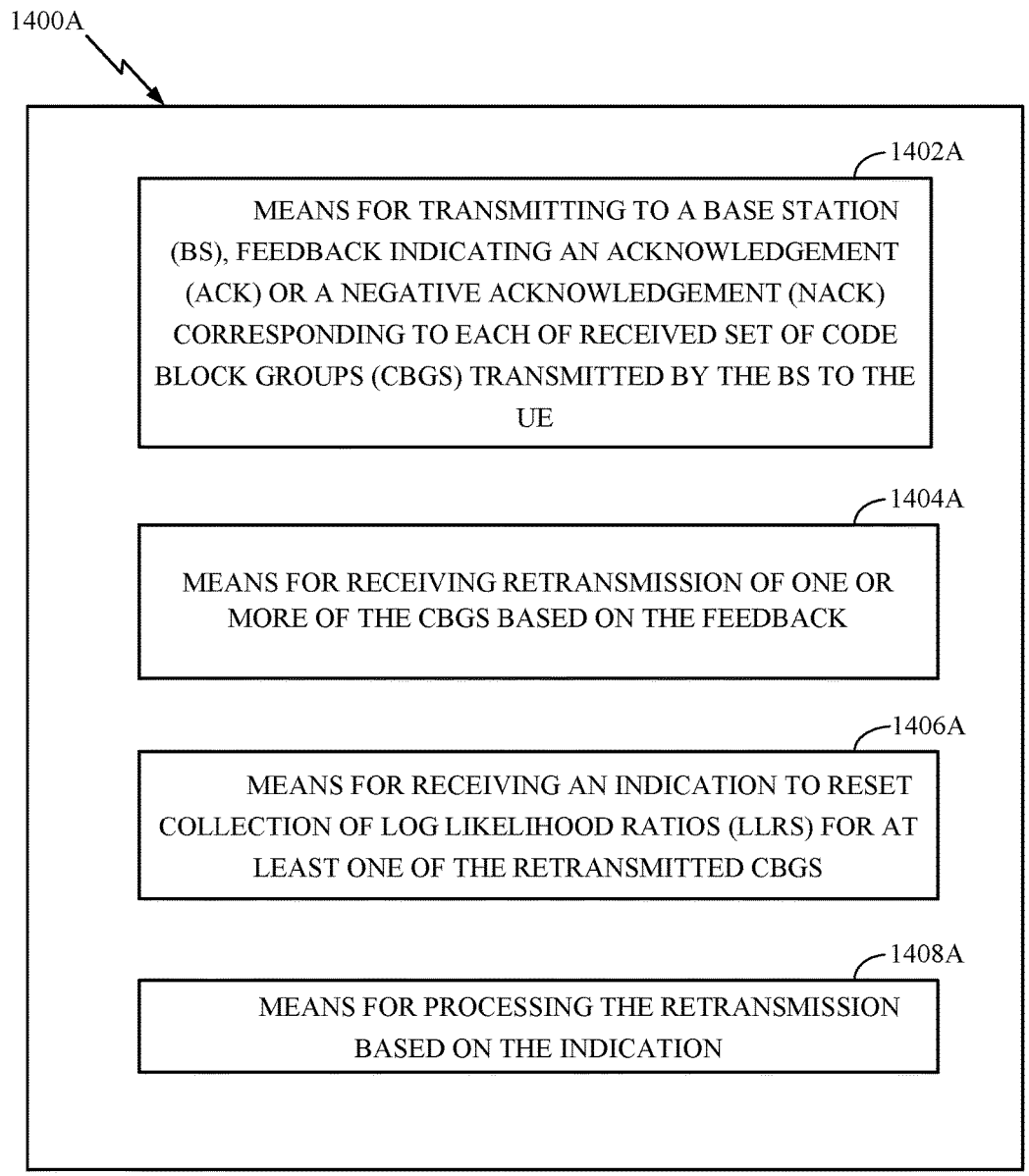
FIG. 14a illustrates a communications device 1400A (e.g., UE) that may include various means-plus-function components configured to perform the operations 1400 illustrated in FIG. 14.

FIG. 14A illustrates a communications device 1400A (e.g., UE) that may include various means-plus-function components configured to perform the operations 1400 illustrated in FIG. 14. For example, at 1402A, the communications device 1400A includes means for performing operations illustrated at 1402 in FIG. 14. At 1404A, the communications device 1400A includes means for performing operations illustrated at 1404 in FIG. 14. At 1406A, the communications device 1400A includes means for performing operations illustrated at 1406 in FIG. 14. At 1408A, the communications device 1400A includes means for performing operations illustrated in 1408 in FIG. 14.

Figure 15:
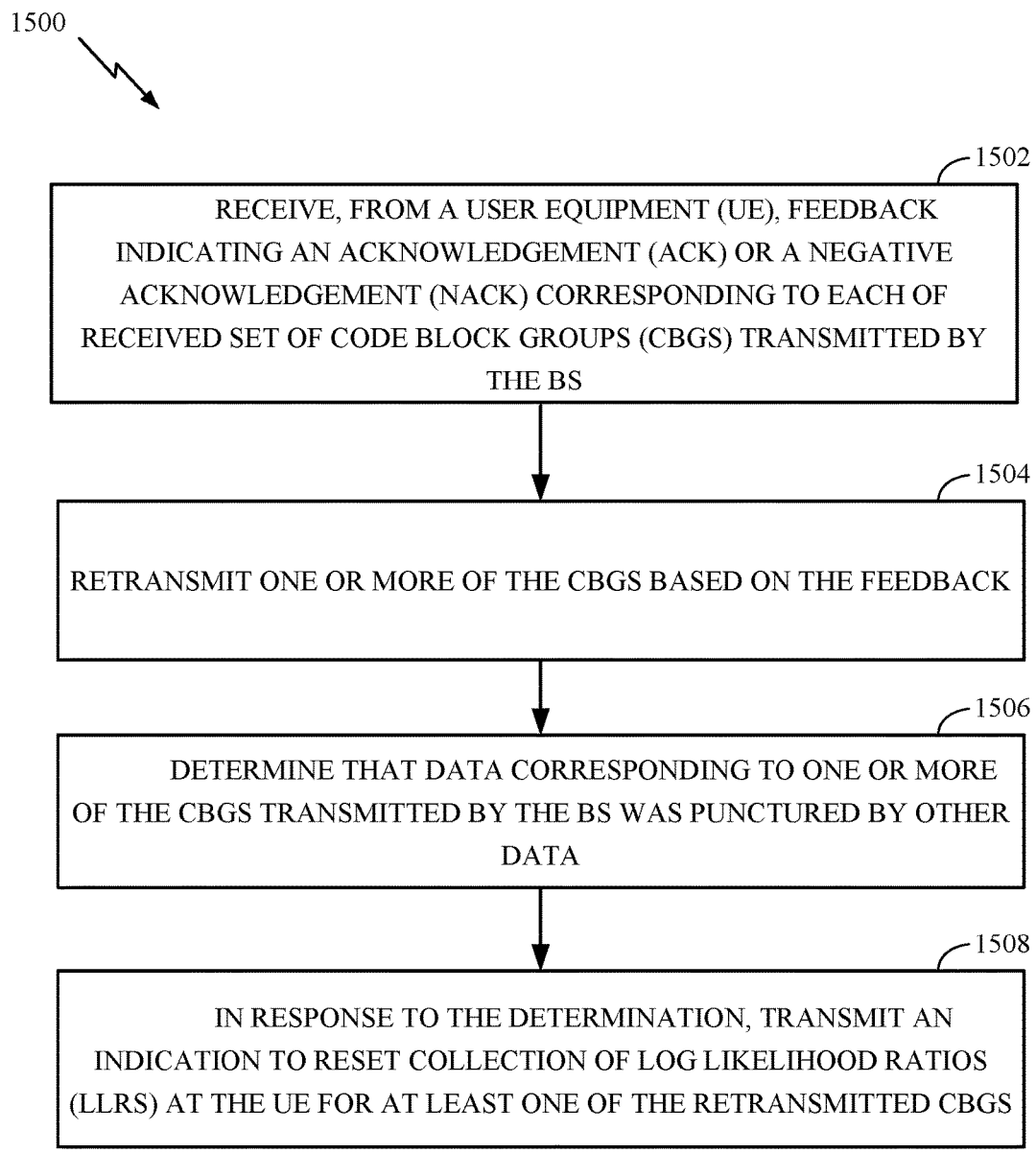
FIG. 15 illustrates example operations 1500 performed by a base station for resetting LLRs at a UE of one or more CBGs retransmitted by the base station, in accordance with certain aspects of the present disclosure.

FIG. 15 illustrates example operations 1500 performed by a base station (e.g., gNB) for resetting LLRs at a UE of one or more CBGs retransmitted by the base station, in accordance with certain aspects of the present disclosure.

Operations 1500 begin, at 1502, by receiving from the UE, feedback indicating an ACK or a NACK corresponding to each of a received set of CBGs transmitted by the BS. In an aspect, the feedback includes an ACK/NACK bitmap as described in the above paragraphs.

At 1504, the base station retransmits one or more of the CBGs based on the feedback. In an aspect, the gNB receives and decodes the ACK/NACK feedback from the UE. The gNB retransmits a CBG corresponding to each NACK decoded by the gNB.

At 1506, the base station determines that data corresponding to one or more of the CBGs transmitted by the base station was punctured by other data. For example when eMBB and URLL coexist, the gNB may puncture some resources assigned for the PDSCH of an eMBB UE to serve a URLLC UE. In such a case, many samples of CBGs are punctured which may lead to failed reception of the CBGs at the UE.

At 1508, in response to the determination, the base station transmits an indication to reset collection of LLRs at the UE for at least one of the retransmitted CBGs. In certain aspects, in CBG based retransmission, the gNB may include (e.g., in a DCI) at least one bit (e.g., LLR reset indicator bit(s)) to indicate to the UE that the LLR combination is to be stopped for one or more CBGs received by the UE and LLR collection for the CBGs is to be reset.

Figure 15A:
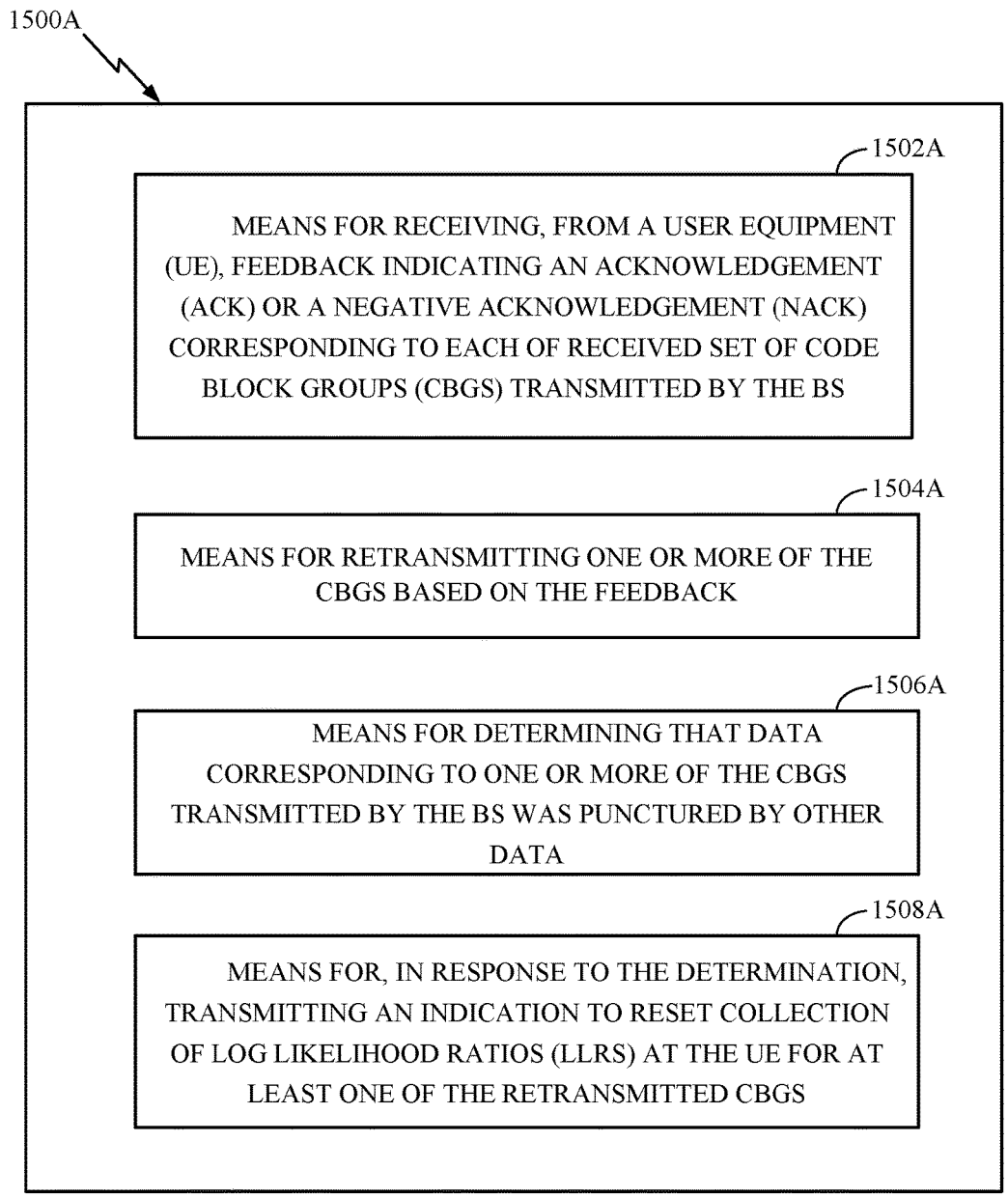
FIG. 15a illustrates a communications device 1500A (e.g., gNB) that may include various means-plus-function components configured to perform the operations 1500 illustrated in FIG. 15.

FIG. 15A illustrates a communications device 1500A (e.g., gNB) that may include various means-plus-function components configured to perform the operations 1500 illustrated in FIG. 15. For example, at 1502A, the communications device 1500A includes means for performing operations illustrated at 1502 in FIG. 15. At 1504A, the communications device 1500A includes means for performing operations illustrated at 1504 in FIG. 15. At 1506A, the communications device 1500A includes means for performing operations illustrated at 1506 in FIG. 15. At 1508A, the communications device 1500A includes means for performing operations illustrated in 1508 in FIG. 15.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
   transmitting to a base station (BS), feedback indicating an Acknowledgement (ACK) or a Negative Acknowledgement (NACK) corresponding to each of received set of code block groups (CBGs) transmitted by the BS to the UE;
   receiving an indication including information regarding whether the feedback was correctly decoded at the BS; and
   processing a retransmission of one or more of the CBGs based on the received indication.

2. The method of claim 1, wherein the feedback comprises a first bitmap of ACKs and NACKs corresponding to the CBGs received by the UE, and the indication comprises a second bitmap of decoding confirmations of the ACKs and the NACKs, the second bitmap corresponding to a result of decoding the first bitmap as received by the BS, and further comprising determining whether the feedback was correctly decoded by the BS based on the second bitmap.

3. The method of claim 2, further comprising determining based on the second bitmap of ACKs or NACKs, ACKs or NACKs corresponding to which CBGs were incorrectly decoded by the BS.

4. The method of claim 2, wherein determining whether the feedback was correctly decoded by the BS based on the second bitmap comprises:
   comparing the second bitmap with the first bitmap;
   determining that the feedback was correctly decoded by the BS if the second bitmap is the same as the first bitmap; and
   determining that the feedback was incorrectly decoded by the BS if the second bitmap is not the same as the first bitmap.

5. The method of claim 1, further comprising receiving the retransmission of the one or more of the CBGs based on the received indication.

6. The method of claim 1, further comprising combining Log Likelihood Ratios (LLRs) of each of the retransmitted CBGs with an LLR of a previously received version of the CBG to decode the CBG, in response to determining that the feedback was correctly decoded by the BS.

7. The method of claim 1, further comprising determining not to combine Log Likelihood Ratios (LLRs) of one or more of the retransmitted CBGs with corresponding LLRs of previously received versions of the one or more CBGs, in response to determining that the feedback was incorrectly decoded by the BS.

8. The method of claim 1, wherein the indication is received in a Downlink Control Information (DCI) as a retransmission grant.

9. The method of claim 8, wherein a length of the DCI is maintained regardless of whether or not the DCI includes the indication.

10. The method of claim 8, wherein a length of the DCI is different from a default length of the DCI if the DCI includes the indication.

11. The method of claim 1, wherein the indication is received in a companion DCI different from a default DCI that includes a retransmission grant corresponding to the one or more CBGs.

12. The method of claim 11, further comprising receiving an indication of the companion DCI in the default DCI.

13. The method of claim 1, wherein the feedback comprises information regarding a first bitmap of ACKs and NACKs corresponding to the CBGs received by the UE, and the indication comprises a hash of a second bitmap of ACKs and NACKs received by the BS, the second bitmap based on a result of decoding the first bitmap at the BS, and further comprising determining whether the feedback was correctly decoded by the BS based on the hash of the second bitmap.

14. The method of claim 13, wherein the hash of the second bit map comprises a CRC generated by the BS based on the second bitmap.

15. The method of claim 14, wherein determining whether the feedback was correctly decoded by the BS based on the hash of the second bitmap comprises:
   generating a second CRC based on the first bitmap using the same CRC generation function used by the BS for generating the CRC;
   comparing the generated second CRC with the received CRC;
   determining that the feedback was correctly decoded by the BS if the second CRC is same as the received CRC; and
   determining that the feedback was incorrectly decoded by the BS if the second CRC is not same as the received CRC.

16. The method of claim 14, further comprising transmitting in the feedback a second CRC generated based on the first bitmap.

17. The method of claim 16, further comprising generating the second CRC using a CRC generation function different from another CRC generation function used by the BS for generating the CRC based on the second bitmap.

18. The method of claim 1, wherein the feedback comprises information regarding a first bitmap of ACKs and NACKs corresponding to the received CBGs, and the indication comprises Downlink Control Information (DCI) and a CRC, the CRC generated based on a concatenated sequence of DCI and a second bitmap of ACKs and NACKs received by the BS and further scrambled using an identity of the UE, the second bitmap based on a result of decoding the first bitmap at the BS, and further comprising determining whether the feedback was correctly decoded by the BS based on the received DCI and the CRC.

19. The method of claim 18, wherein determining whether the feedback was correctly decoded by the BS based on the received DCI and the CRC comprises:
   decoding the received DCI and the CRC;
   generating a second CRC based on a concatenated sequence of the decoded DCI and the first bitmap and further scrambling the concatenated sequence using the identity of the UE;
   comparing the generated second CRC with the received CRC;
   determining that the feedback was correctly decoded by the BS and receiving a retransmission grant based on results of the decoding, if the second CRC is same as the received CRC; and
   ignoring the results of the decoding if the second CRC is not same as the received CRC.

20. The method of claim 1, wherein the feedback comprises information regarding a first bitmap of ACKs and NACKs corresponding to the received CBGs, and the indication comprises Downlink Control Information (DCI) and a CRC, the CRC generated based on the DCI and then scrambled with an identity of the UE and a second bitmap of ACKs and NACKs received by the BS, the second bitmap based on a result of decoding the first bitmap at the BS, and further comprising determining whether the feedback was correctly decoded by the BS based on the received DCI and the CRC.

21. The method of claim 20, wherein determining whether the feedback was correctly decoded by the BS based on the received DCI and the CRC comprises:
decoding the received DCI and the CRC;
generating a second CRC based on the decoded DCI;
scrambling the second CRC with the identity of the UE and the first bitmap;
comparing the generated second CRC with the received CRC;
determining that the feedback was correctly decoded by the BS and receiving a retransmission grant based on results of the decoding, if the second CRC is same as the received CRC; and
ignoring the results of the decoding, if the second CRC is not same as the received CRC.

22. The method of claim 1, further comprising receiving another indication from the BS in Downlink Control Information (DCI) to stop soft combining of Log Likelihood Ratios (LLRs) for one or more CBGs from previous transmissions received at the UE, wherein the another indication comprises at least one bit.

23. The method of claim 1, further comprising:
transmitting further feedback including a NACK for each CBG in the set of CBGs that has not been decoded after receiving the retransmission; and
receiving further retransmission based on the further feedback.

24. A method of wireless communication by a Base Station (BS), comprising:
receiving, from a User Equipment (UE), feedback indicating an Acknowledgement (ACK) or a Negative Acknowledgement (NACK) corresponding to each of received set of code block groups (CBGs) transmitted by the BS;
transmitting an indication including information regarding whether the feedback was correctly decoded at the BS; and
retransmitting one or more of the CBGs based on the transmitted indication.

25. The method of claim 24, wherein the feedback comprises a first bitmap of ACKs and NACKs corresponding to the CBGs transmitted to the UE, and the indication comprises a second bitmap of decoding confirmations of the ACKs and the NACKs, the second bitmap corresponding to a result of the first bitmap as received by the BS.

26. The method of claim 24, wherein transmitting the indication comprises transmitting the indication in Downlink Control Information (DCI) as a retransmission grant.

27. The method of claim 26, wherein a length of the DCI is maintained regardless of whether or not the DCI includes the indication.

28. The method of claim 26, wherein a length of the DCI is different from a default length of the DCI, if the DCI includes the indication.

29. The method of claim 24, wherein transmitting the indication comprises transmitting the indication in a companion DCI different from a default DCI that includes a retransmission grant corresponding to the one or more CBGs.

30. The method of claim 29, further comprising transmitting an indication of the companion DCI in the default DCI.

31. The method of claim 24, wherein the feedback comprises information regarding a first bitmap of ACKs and NACKs corresponding to the CBGs transmitted to the UE, and the indication comprises a hash of a second bitmap of ACKs and NACKs received by the BS, the second bitmap based on a result of decoding the first bitmap at the BS.

32. The method of claim 31, further comprising generating a CRC based on the second bitmap, wherein the hash of the second bit map includes the CRC generated based on the second bitmap.

33. The method of claim 31, further comprising:
receiving in the feedback a CRC generated based on the first bitmap; and
validating the first bitmap based on the received CRC.

34. The method of claim 24, wherein the feedback comprises information regarding a first bitmap of ACKs and NACKs corresponding to the transmitted CBGs, and the indication comprises Downlink Control Information (DCI) and a CRC, further comprising:
generating the CRC based on a concatenated sequence of DCI and a second bitmap of ACKs and NACKs received by the BS, the second bitmap based on a result of decoding the first bitmap at the BS; and
scrambling the CRC using an identity of the UE.

35. The method of claim 34, further comprising:
transmitting a grant for retransmitting the one or more CBGs;
detecting that no ACK or NACK is received from the UE corresponding to the grant; and
in response to the detecting, determining that the BS incorrectly decoded the feedback.

36. The method of claim 24, wherein the feedback comprises information regarding a first bitmap of ACKs and NACKs corresponding to the transmitted CBGs, and the indication comprises Downlink Control Information (DCI) and a CRC, further comprising:
generating the CRC based on a DCI; and
scrambling the generated CRC with an identity of the UE and a second bitmap of ACKs and NACKs received by the BS, the second bitmap based on a result of decoding the first bitmap at the BS.

37. The method of claim 36, further comprising:
transmitting a grant for retransmitting the one or more CBGs;
detecting that no ACK or NACK is received from the UE corresponding to the grant; and
in response to the detecting, determining that the BS incorrectly decoded the feedback.

38. The method of claim 24, further comprising:
determining that data corresponding to one or more of the transmitted CBGs was punctured by other data; and
in response, transmitting a second indication from the BS to stop soft combining Log Likelihood Ratios (LLRs) for the one or more CBGs, wherein the second indication comprises at least one bit.

39. An apparatus for wireless communication by a User Equipment (UE), comprising:
means for transmitting to a base station (BS), feedback indicating an Acknowledgement (ACK) or a Negative Acknowledgement (NACK) corresponding to each of received set of code block groups (CBGs) transmitted by the BS to the UE;

means for receiving an indication including information regarding whether the feedback was correctly decoded at the BS; and means for processing a retransmission of one or more of the CBGs based on the received indication.

40. An apparatus for wireless communication by a Base Station (BS), comprising:

means for receiving, from a User Equipment (UE), feedback indicating an Acknowledgement (ACK) or a Negative Acknowledgement (NACK) corresponding to each of received set of code block groups (CBGs) transmitted by the BS;

means for transmitting an indication including information regarding whether the feedback was correctly decoded at the BS; and means for retransmitting one or more of the CBGs based on the transmitted indication.

41. A method for wireless communication by a User Equipment (UE), comprising:

transmitting to a base station (BS), feedback indicating an Acknowledgement (ACK) or a Negative Acknowledgement (NACK) corresponding to each of received set of code block groups (CBGs) transmitted by the BS to the UE;

receiving retransmission of one or more of the CBGs based on the feedback;

receiving an indication to reset collection of Log Likelihood Ratios (LLRs) for at least one of the retransmitted CBGs; and processing the retransmission based on the indication.

42. The method of claim 41, wherein receiving the indication includes receiving the indication in Downlink Control Information (DCI).

43. The method of claim 41, wherein the indication includes at least one bit to indicate the reset of the LLRs.

44. The method of claim 41, wherein the indication includes a New Data Indicator (NDI) bit interpreted as an indicator bit for the LLR reset.

45. A method of wireless communication by a Base Station (BS), comprising:

receiving, from a User Equipment (UE), feedback indicating an Acknowledgement (ACK) or a Negative Acknowledgement (NACK) corresponding to each of received set of code block groups (CBGs) transmitted by the BS;

retransmitting one or more of the CBGs based on the feedback;

determining that data corresponding to one or more of the CBGs transmitted by the BS was punctured by other data; and in response to the determination, transmitting an indication to reset collection of Log Likelihood Ratios (LLRs) at the UE for at least one of the retransmitted CBGs.

46. The method of claim 45, wherein transmitting the indication includes transmitting the indication in Downlink Control Information (DCI).

47. The method of claim 45, wherein the indication includes at least one bit to indicate the reset of the LLRs.

48. The method of claim 45, wherein the indication includes a New Data Indicator (NDI) bit interpreted as an indicator bit for the LLR reset.

* * * * *